United States Patent [19]

Narey et al.

[11] 4,021,780

[45] May 3, 1977

[54] BALLOT TALLYING SYSTEM INCLUDING A DIGITAL PROGRAMMABLE READ ONLY CONTROL MEMORY, A DIGITAL BALLOT IMAGE MEMORY AND A DIGITAL TOTALS MEMORY

[76] Inventors: James O. Narey, 14331 Purdy St., Westminster, Calif. 92683; William H. Saylor, 31791 South Coast Highway, South Laguna, Calif. 92677

[22] Filed: Sept. 24, 1975

[21] Appl. No.: 616,328

[52] U.S. Cl. .......................... 340/172.5; 235/54 F; 235/61.9 R

[51] Int. Cl.$^2$ .................. G07C 13/00; G06K 3/00; G06F 7/12

[58] Field of Search ............... 340/172.5; 235/54 F, 235/61.9 R, 92 AC

[56] References Cited

UNITED STATES PATENTS

| | | | |
|---|---|---|---|
| 3,710,105 | 1/1973 | Oxendine, Jr. et al. | 235/54 F |
| 3,739,151 | 6/1973 | Moldovan, Jr. et al. | 235/54 F |
| 3,748,646 | 7/1973 | Schultz et al. | 340/172.5 |
| 3,847,345 | 11/1974 | Moldovan, Jr. et al. | 235/54 F |

*Primary Examiner*—Melvin B. Chapnick

[57] ABSTRACT

Ballot receiving, storing, and tallying system, capable of reading individual ballots and of delivering a printed record showing the subtotals of votes cast for the various candidates, propositions, and the like, and incorporating solid-state logic circuits for carrying out various functions of the system. The system includes a digital programmable read-only control memory for storing a group of instruction words representing possible vote marking positions on ballot formats interpreted by the system; a digital ballot image memory for temporarily storing representations of all marks on a ballot sensed as the ballot passes a mark sensing station; and a digital totals memory for maintaining incrementally up-dated totals accumulated for each vote marking position on the ballot. Also included is an interlocking circuit which prevents the accepting and feeding of any ballots, for example, until after a key operated switch has been properly actuated.

2 Claims, 46 Drawing Figures

PAGE 1.

PROGRAM COUNTER DECODE

PROGRAM COUNTER DECODE

PAGE 6.

PAGE 8.

SN 74123

| INPUTS | | | OUTPUTS | |
|---|---|---|---|---|
| CLEAR | A | B | Q | Q̄ |
| L | X | X | L | H |
| X | H | X | L | H |
| X | X | L | L | H |
| H | L | ↑ | ⊓ | ⊔ |
| H | ↓ | H | ⊓ | ⊔ |
| ↑ | L | H | ⊓ | ⊔ |

PAGE 10.

PAGE 13.

MEMORY OUTPUT REGISTER

PAGE 15.

SN 74123

| INPUTS | | | OUTPUTS | |
|---|---|---|---|---|
| CLEAR | A | B | Q | $\overline{Q}$ |
| L | X | X | L | H |
| X | H | X | L | H |
| X | X | L | L | H |
| H | L | ↑ | ⎍ | ⎎ |
| H | ↓ | H | ⎍ | ⎎ |
| ↑ | L | H | ⎍ | ⎎ |

| Connector | DATA INPUTS | | DATA OUTPUTS | Connector |
|---|---|---|---|---|
| P19, | MA00X — 1K13-11 | | mA00X — 1K13-12 | P19, |
| P19, | MA01X — 1K12-11 | | mA01X — 1K12-12 | P19, |
| P19, | MA02X — 1K15-11 | | mA02X — 1K15-12 | P19, |
| P19, | MA03X — 1K14-11 | | mA03X — 1K14-12 | P19, |
| P19, | MA04X — 1J13-11 | | mA04X — 1J13-12 | P19, |
| P19, | MA05X — 1J12-11 | | mA05X — 1J12-12 | P19, |
| P19, | MA06X — 1J15-11 | | mA06X — 1J15-12 | P19, |
| P19, | MA07X — 1J14-11 | | mA07X — 1J14-12 | P19, |
| P19, | MA08X — 1K10-11 | | mA08X — 1K10-12 | P19, |
| P19, | MA09X — 1K11-11 | | mA09X — 1K11-12 | P19, |
| P19, | MA10X — 1K8-11 | | mA10X — 1K8-12 | P19, |
| P19, | MA11X — 1K9-11 | | mA11X — 1K9-12 | P19, |
| P19, | MA12X — 1J8-11 | | mA12X — 1J8-12 | P19, |
| P19, | MA13X — 1J9-11 | | mA13X — 1J9-12 | P19, |
| P14, | MA14X — 1J10-11 | | mA14X — 1J10-12 | P14, |
| P14, | MA15X — 1J11-11 | | mA15X — 1J11-12 | P14, |
| P1, | MB0X — 1K7-11 | | mB0X — 1K7-12 | P22, |

INTER CONNECTION LIST FOR 2102A MEMORY CHIPS

| Connector | Signal | | | | | | |
|---|---|---|---|---|---|---|---|
| P18, | DR0X | 1J8-09 | through | 1J15-08, | 1K7-08 | through | 1K15-08 |
| P18, | DR1X | 1J8-04 | " | 1J15-04, | 1K7-04 | " | 1K15-04 |
| P18, | DR2X | 1J8-05 | " | 1J15-05 | 1K7-05 | " | 1K15-05 |
| P18, | DR3X | 1J8-06 | " | 1J15-06 | 1K7-06 | " | 1K15-06 |
| P18, | DC0X | 1J8-07 | " | 1J15-07 | 1K7-07 | " | 1K15-07 |
| P18, | DC1X | 1J8-02 | " | 1J15-02 | 1K7-02 | " | 1K15-02 |
| P18, | DC2X | 1J8-01 | " | 1J15-01 | 1K7-01 | " | 1K15-01 |
| P18, | DC3X | 1J8-16 | " | 1J15-16 | 1K7-16 | " | 1K15-16 |
| P18, | DC4X | 1J8-15 | " | 1J15-15 | 1K7-15 | " | 1K15-15 |
| P18, | DC5X | 1J8-14 | " | 1J15-14 | 1K7-14 | " | 1K15-14 |
| P12, | $\overline{SMAXX}$ | 1J8-13 | " | 1J15-13 | 1K8-13 | " | 1K15-14 |
| P12, | $\overline{WMAXX}$ | 1J8-03 | " | 1J15-03 | 1K8-03 | " | 1K15-03 |
| POWER SUPPLY | GND | 1J8 09 | " | 1J15-09, | 1K7-09 | " | 1K15-09 |
| POWER SUPPLY | +5VM | 1J8 10 | Through | 1J15-10 | 1K8 10 | through | 1K15-10 |
| POWER SUPPLY | +5VX | 1J7-10 | | | | | |
| P12, | $\overline{SMBXX}$ | 1J7-13 | | | | | |
| P12, | $\overline{WMBXX}$ | 1J7-03 | | | | | |

FIG. 30.

PRINTER

PRINTER

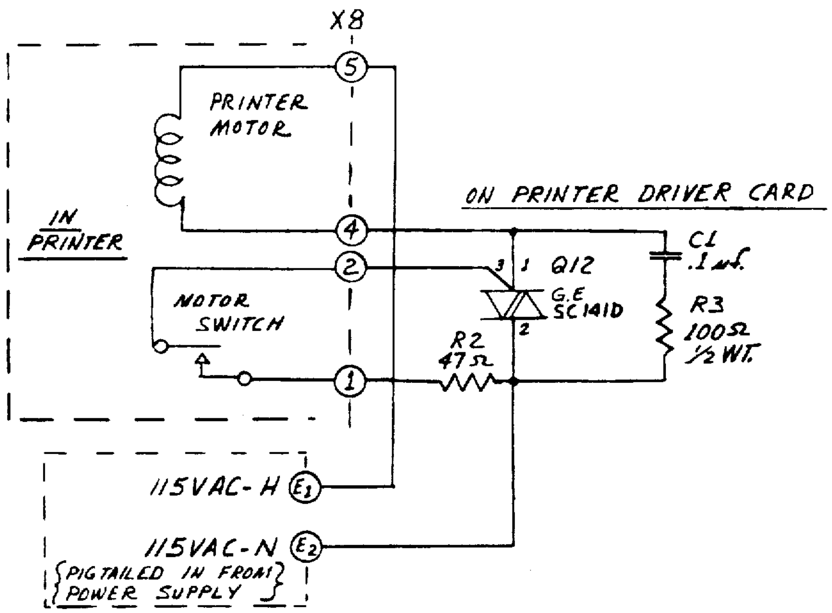
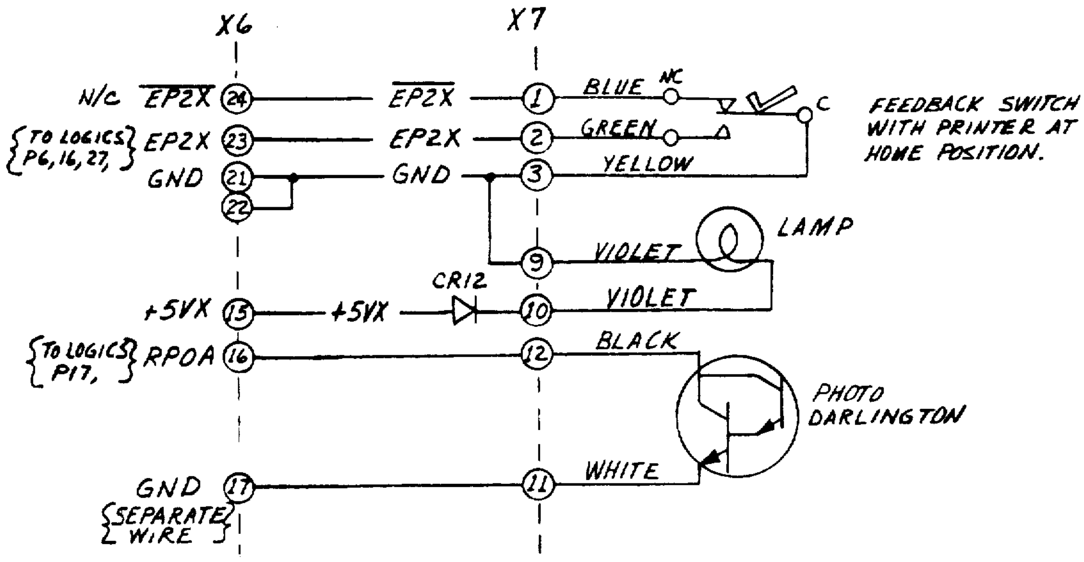
FIG. 33. PRINTER

| X4 | | X5 | |
|---|---|---|---|
| 1 | | 1 | 115VAC-N |
| 2 | | 2 | 115V RD |
| 3 | | 3 | GND |
| 4 | -15VX | 4 | GND |
| 5 | +15VX | 5 | +5VL-4 |
| 6 | GND | 6 | +5VL-3 |
| 7 | RB0A | 7 | RR1B |
| 8 | +5VX | 8 | RR0B |
| 9 | +5VX | 9 | GND |
| 10 | RR2X | 10 | GND |
| 11 | RR3X | 11 | |
| 12 | RB1A | 12 | |
| 13 | DOOBX | 13 | |
| 14 | TAOY | 14 | |
| 15 | -9V | 15 | RB1B |
| 16 | +5VX | 16 | GND |
| 17 | | 17 | GND |
| 18 | GEOX | 18 | +5VX |
| 19 | RUN RX | 19 | +5VL-2 |
| 20 | GND | 20 | RB0B |
| 21 | SUN RD | 21 | GND |
| 22 | | 22 | GND |
| 23 | RR0A | 23 | +5VX |
| 24 | RR1A | 24 | +5VL-1 |

CARD READER

PAGE 1.

PAGE 1.

PAGE 2.

SCHEMATIC OF ELECTRONICS IN BATTERY PACKAGE.

BALLOT TALLYING SYSTEM INCLUDING A DIGITAL PROGRAMMABLE READ ONLY CONTROL MEMORY, A DIGITAL BALLOT IMAGE MEMORY AND A DIGITAL TOTALS MEMORY

This invention relates to a ballot tallying system, more particularly to a multi-functional "ballot box" which not only receives the ballots as fed in by the voters but tallies the votes cast so as to give a complete printout of all of the ballots entered, showing subtotals for the various candidates or propositions, and grand totals as desired.

An object of the invention is to provide a system which collects, reads, and stores ballots and delivers a printed talley showing the nature of the votes cast.

Other objects of the invention will appear as the description thereof proceeds.

FIGS. 3–29 inclusive are logic diagrams of the tallying mechanism.

FIG. 30 is an index and interconnection list thereto.

Figure 31:
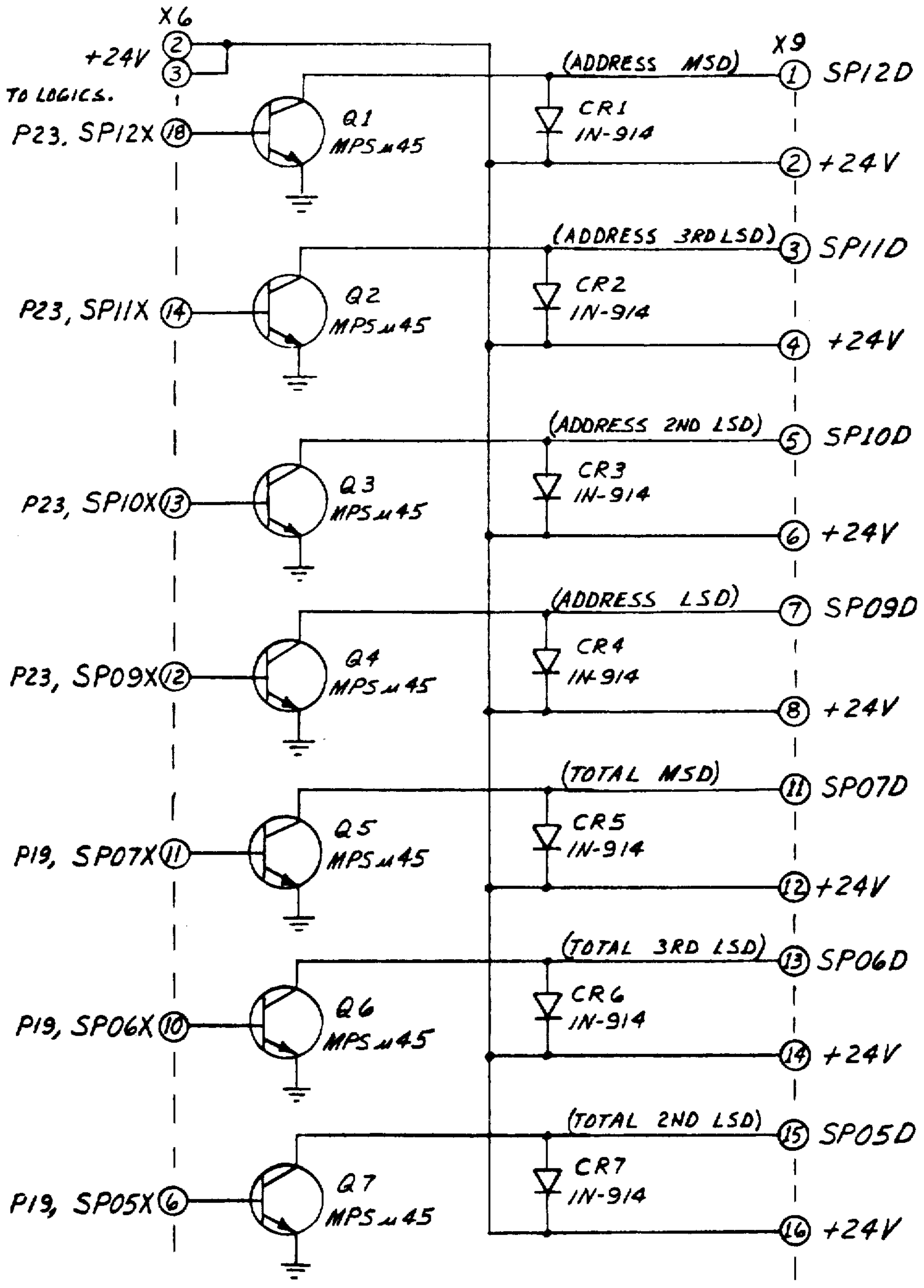
Figure 32:
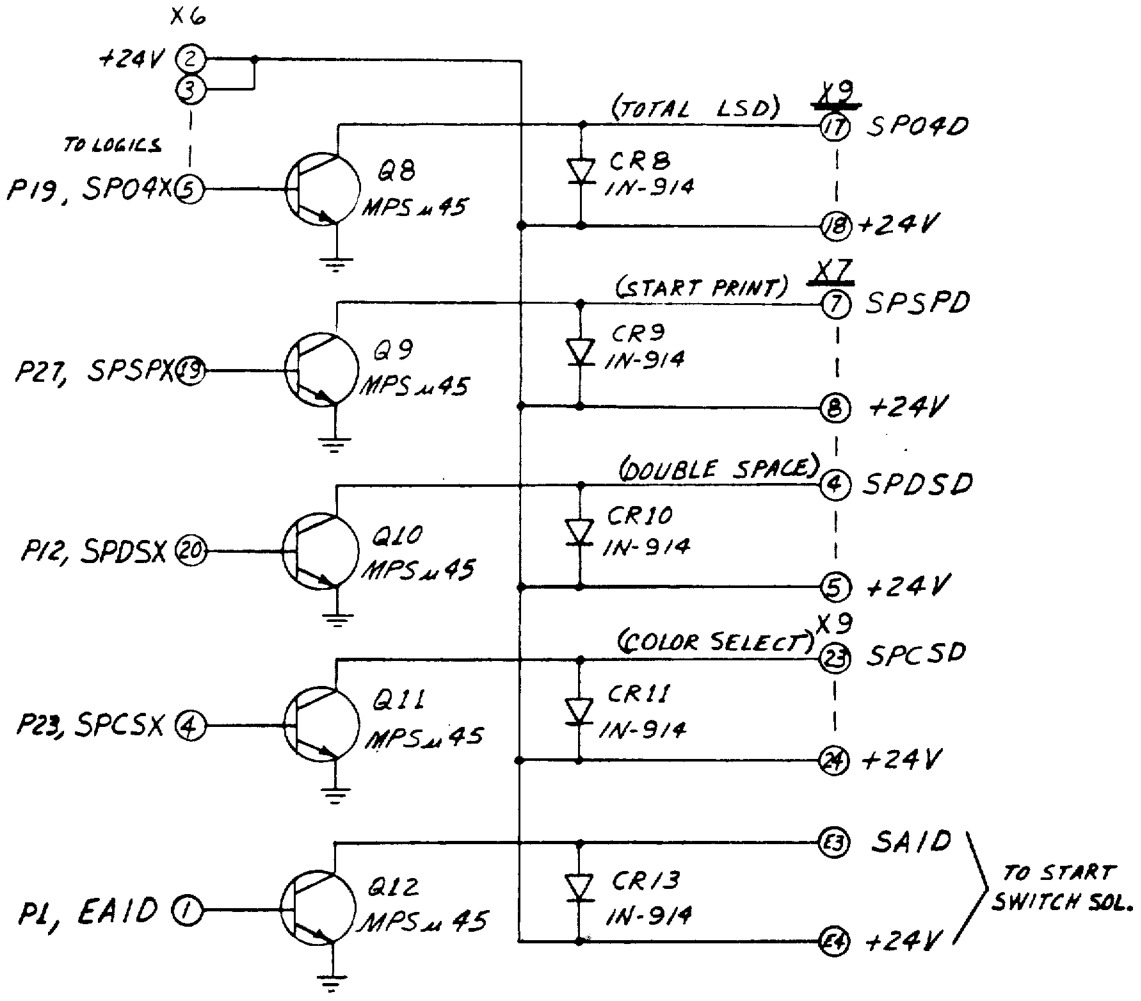
Figure 34:
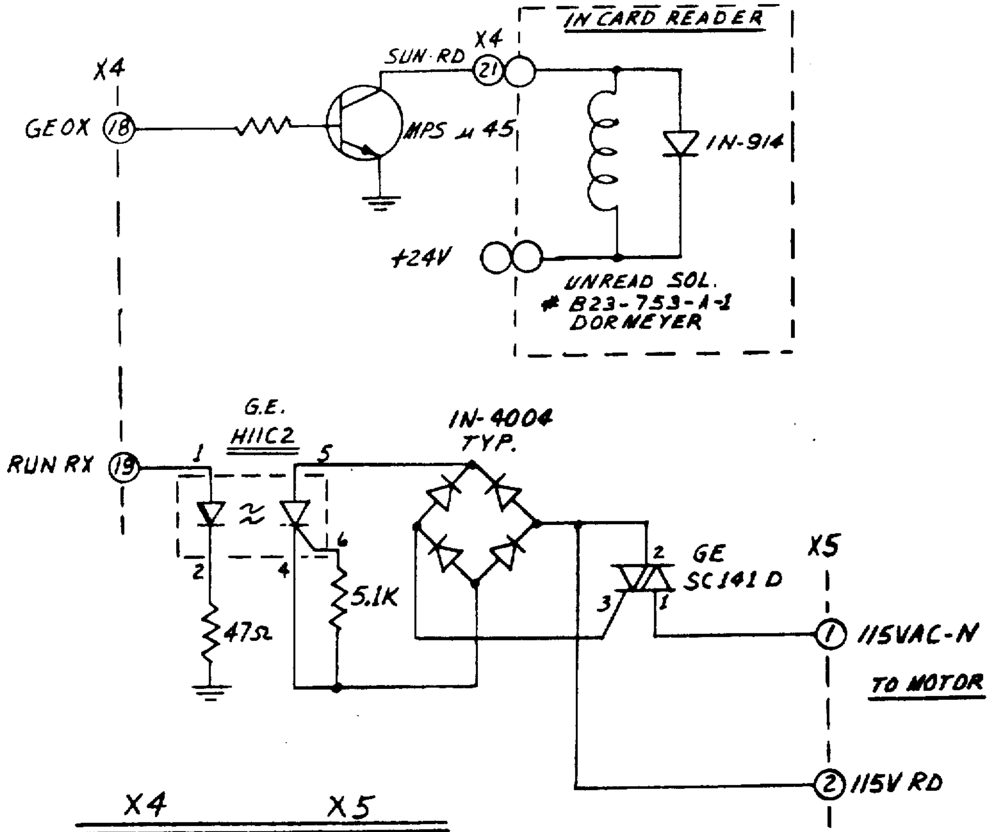
Figure 35:
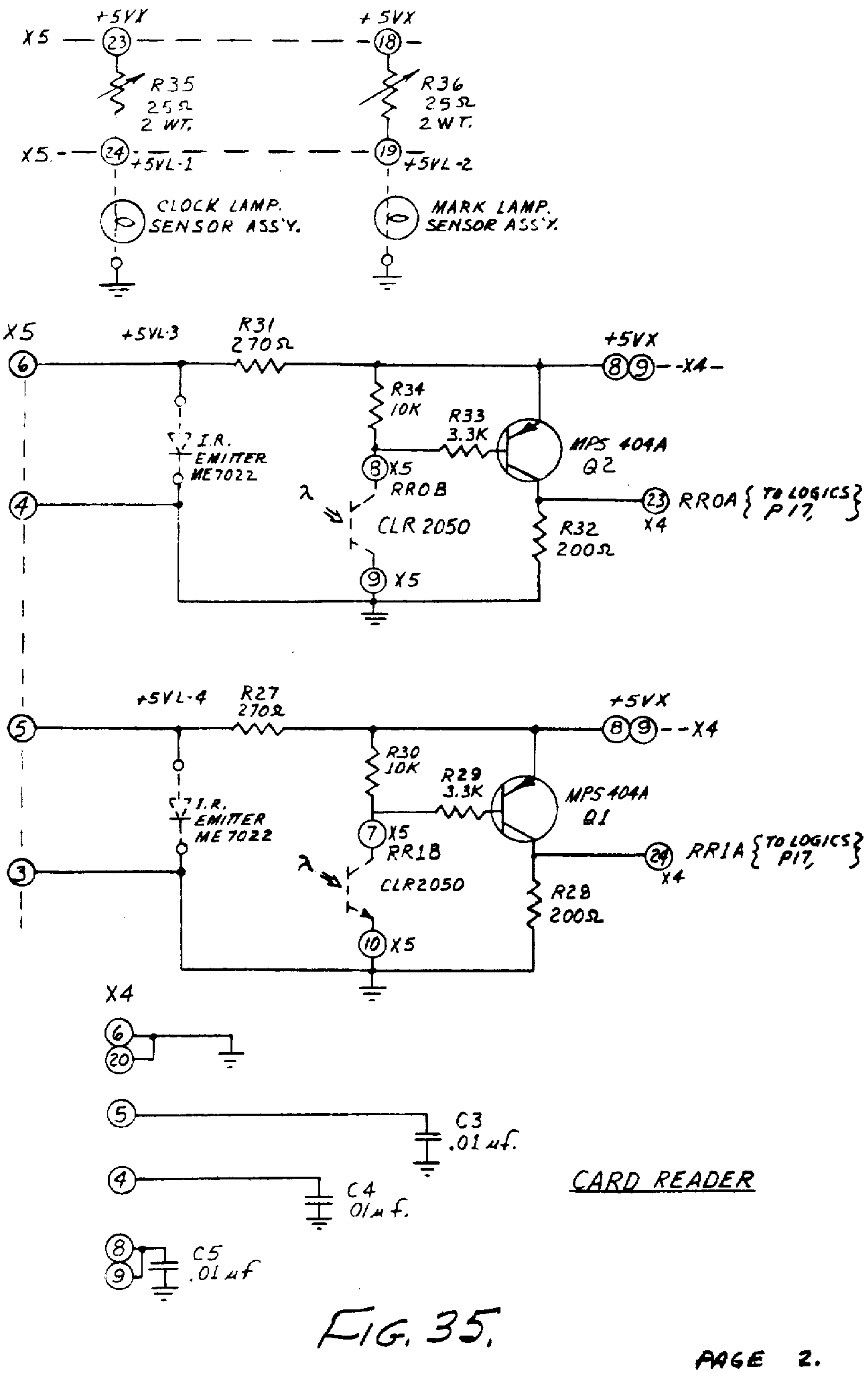
Figure 36:
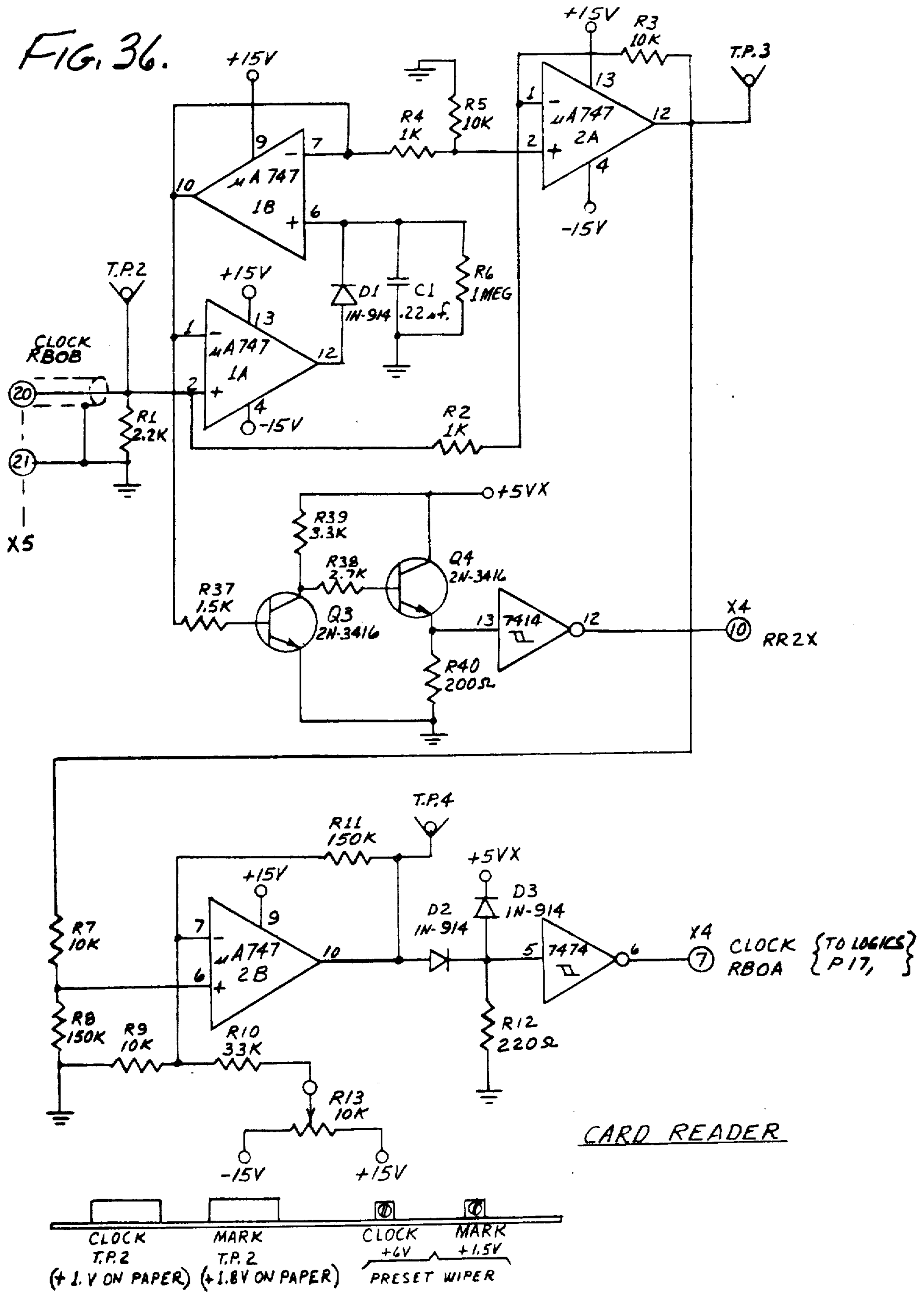
Figure 37:
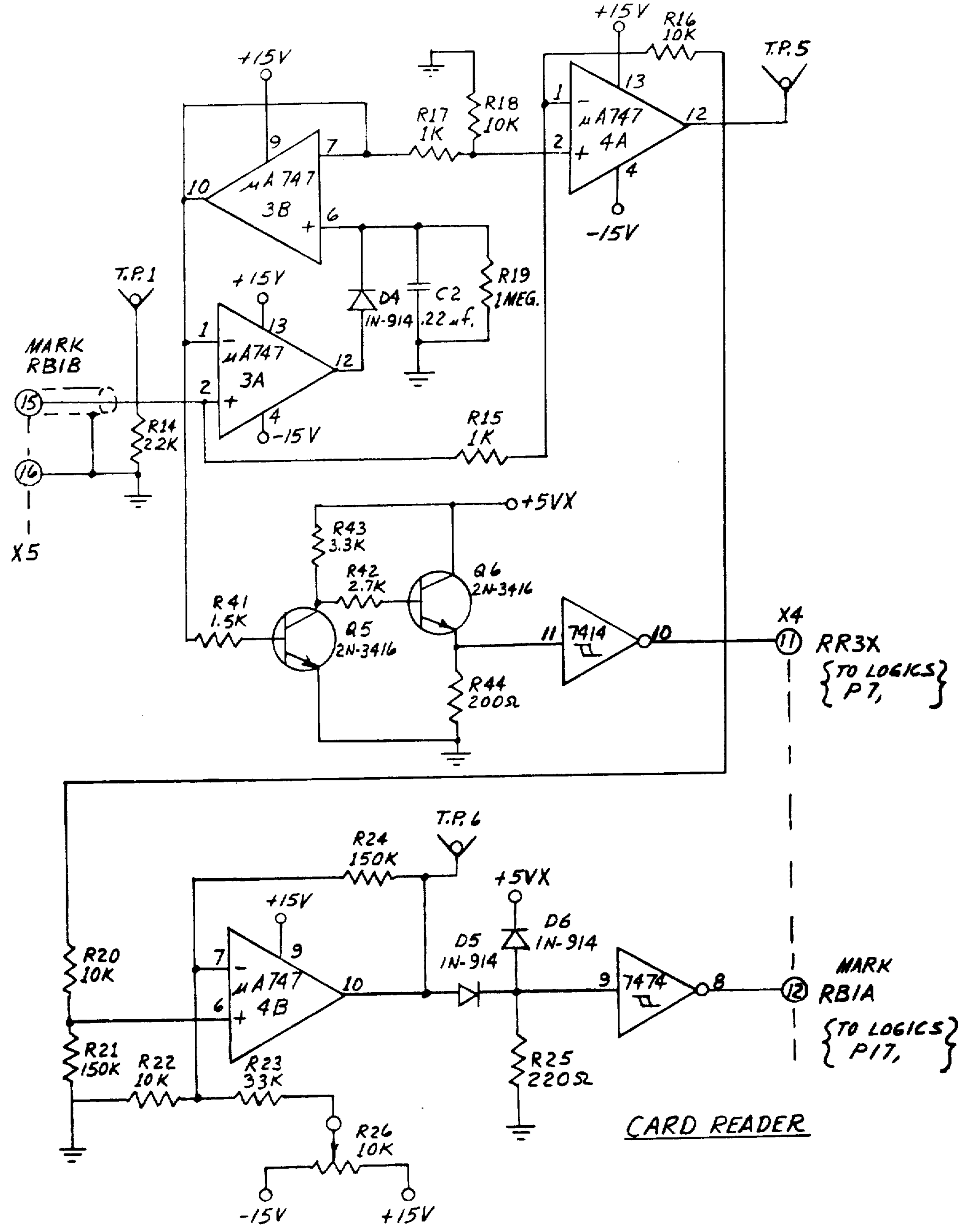
Figure 38:
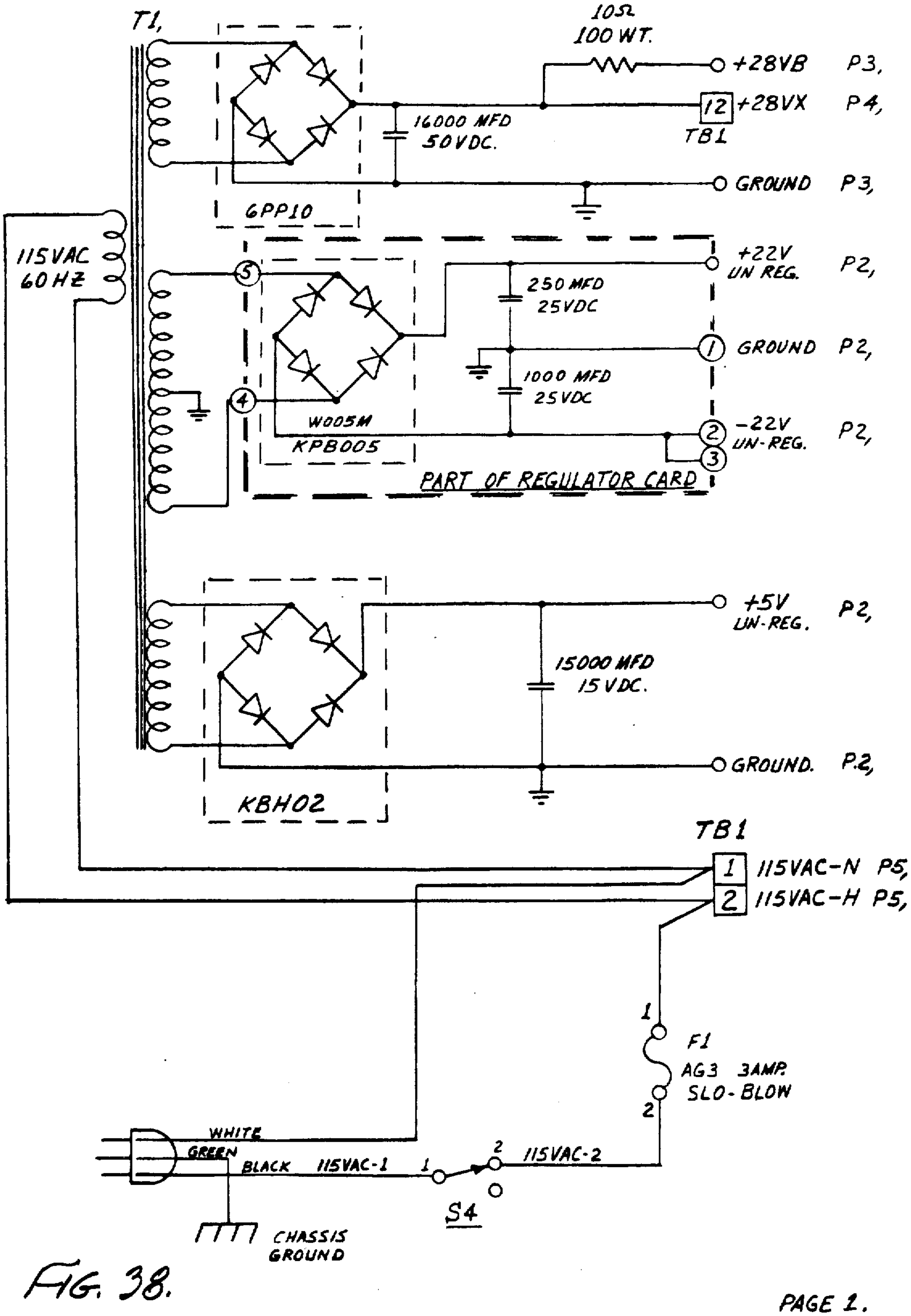
Figure 39:
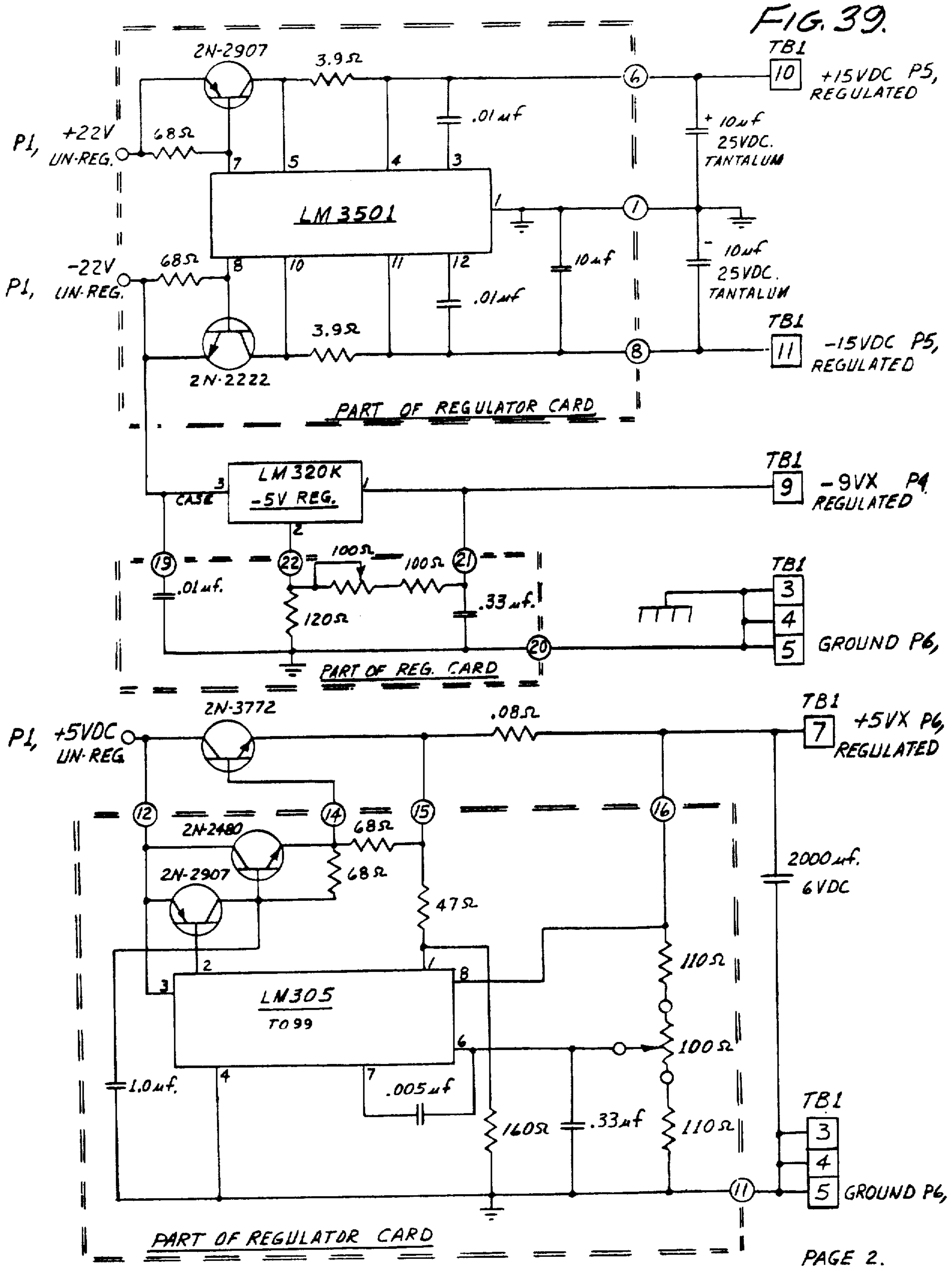
Figure 40:
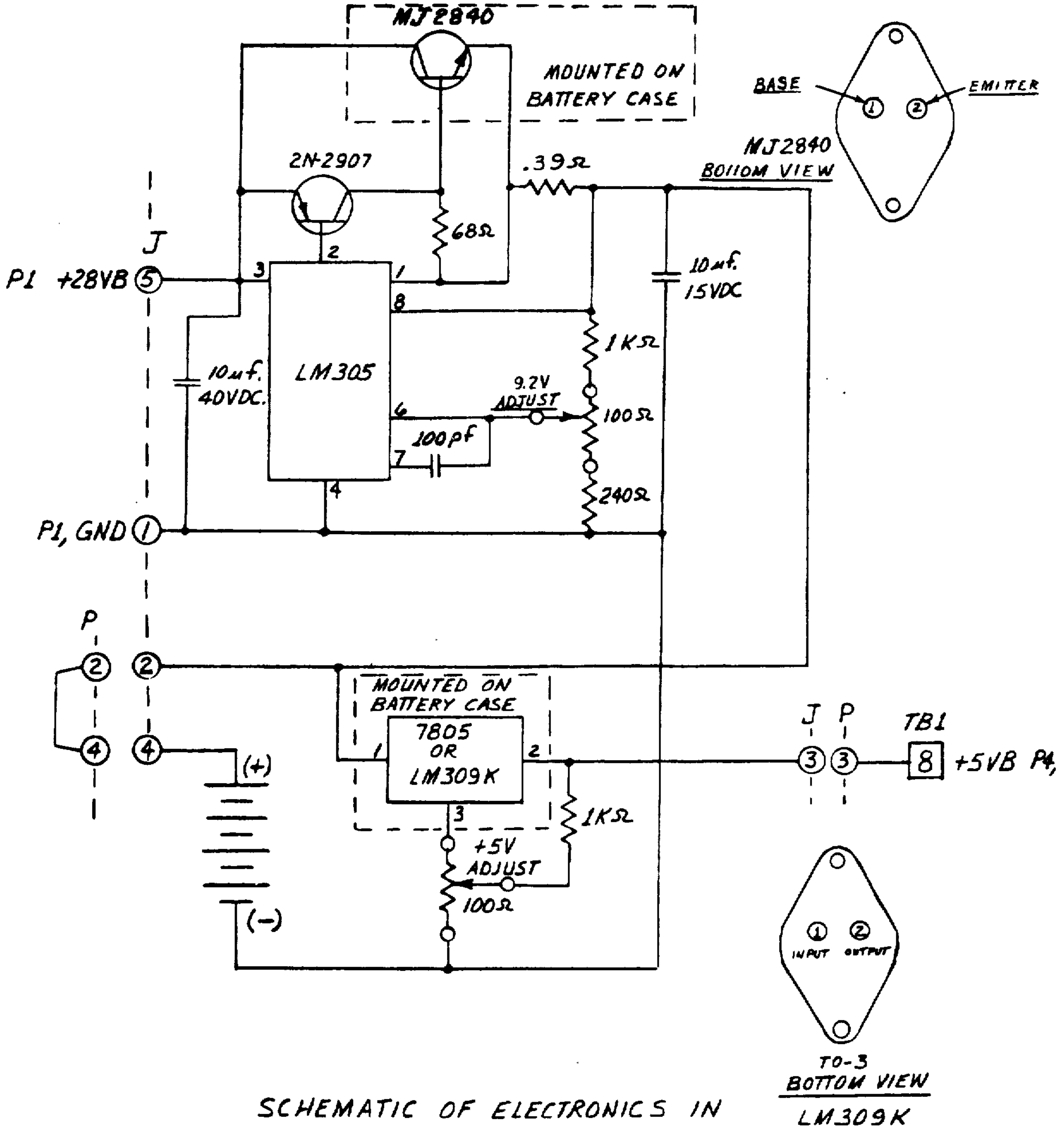
Figure 41:
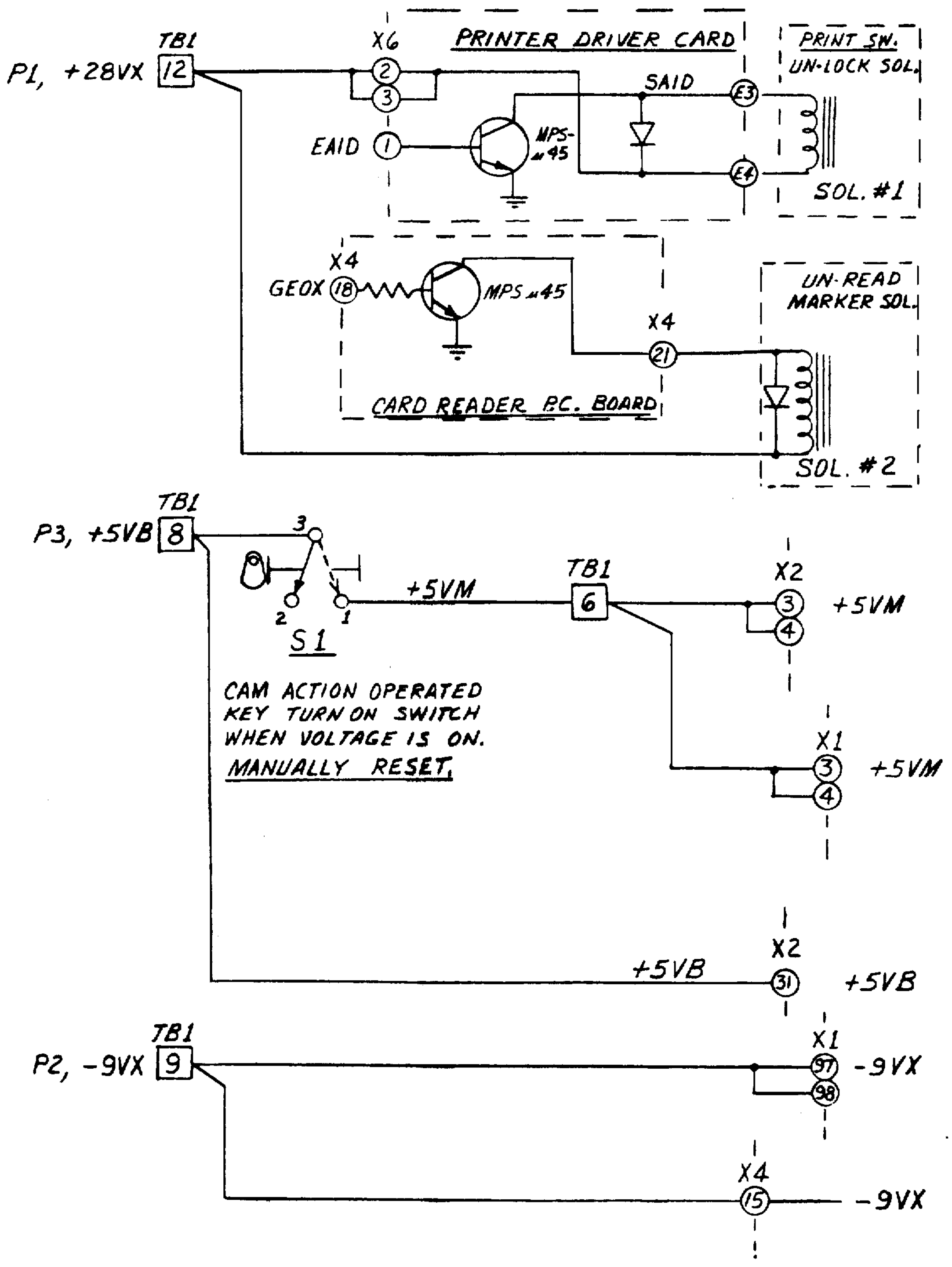
Figure 42:
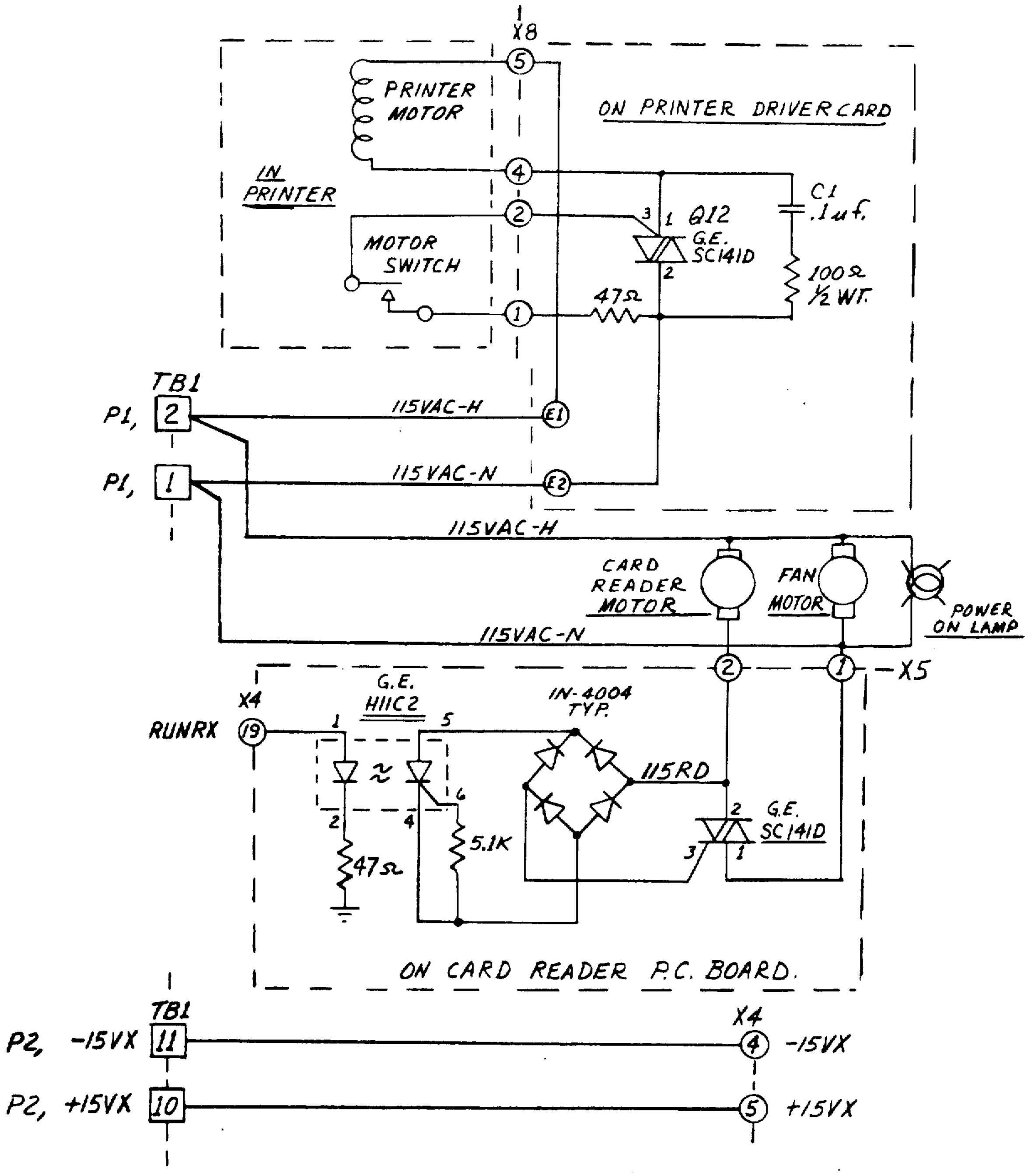
Figure 43:
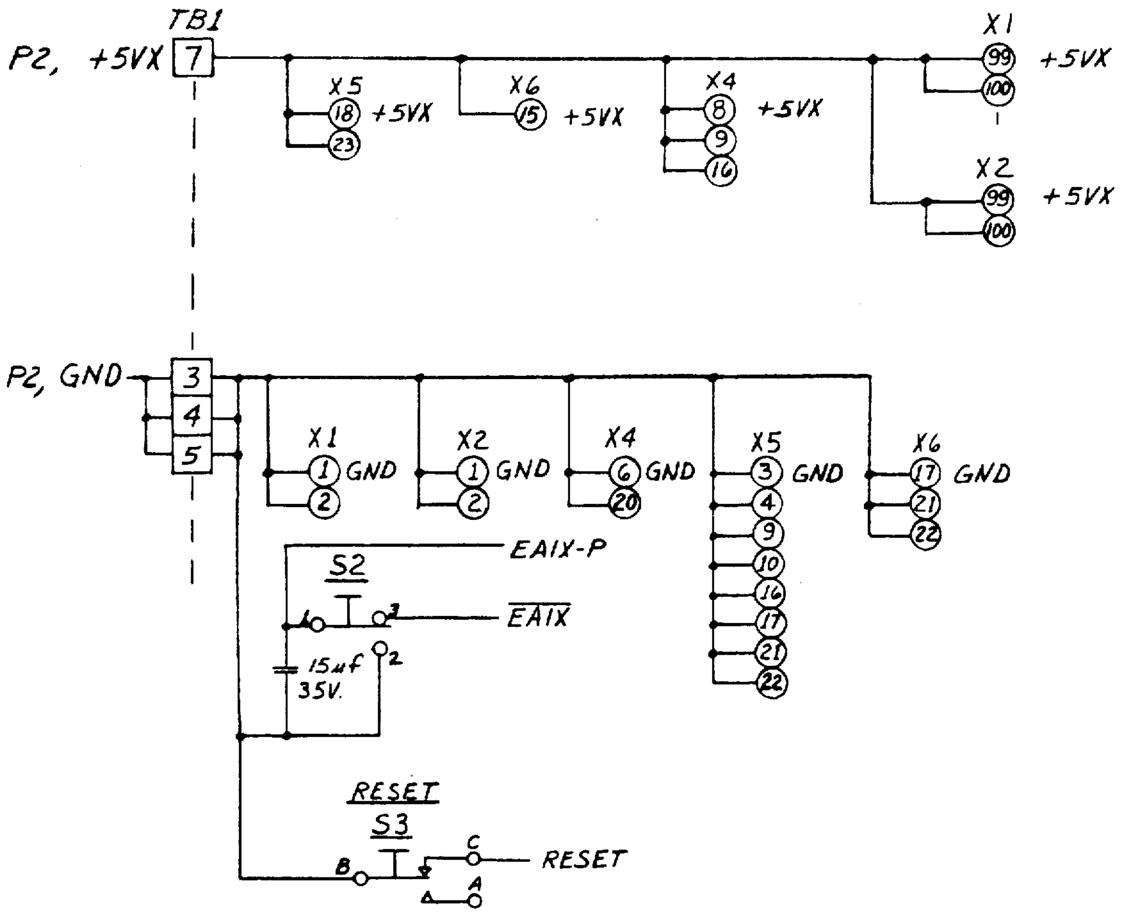

FIGS. 31–33 inclusive are logic diagrams of the printing mechanism.

FIGS. 34–37 inclusive are logic diagrams of the card reading mechanism.

FIGS. 38–43 inclusive are circuit diagrams of the power supply.

Figure 44:
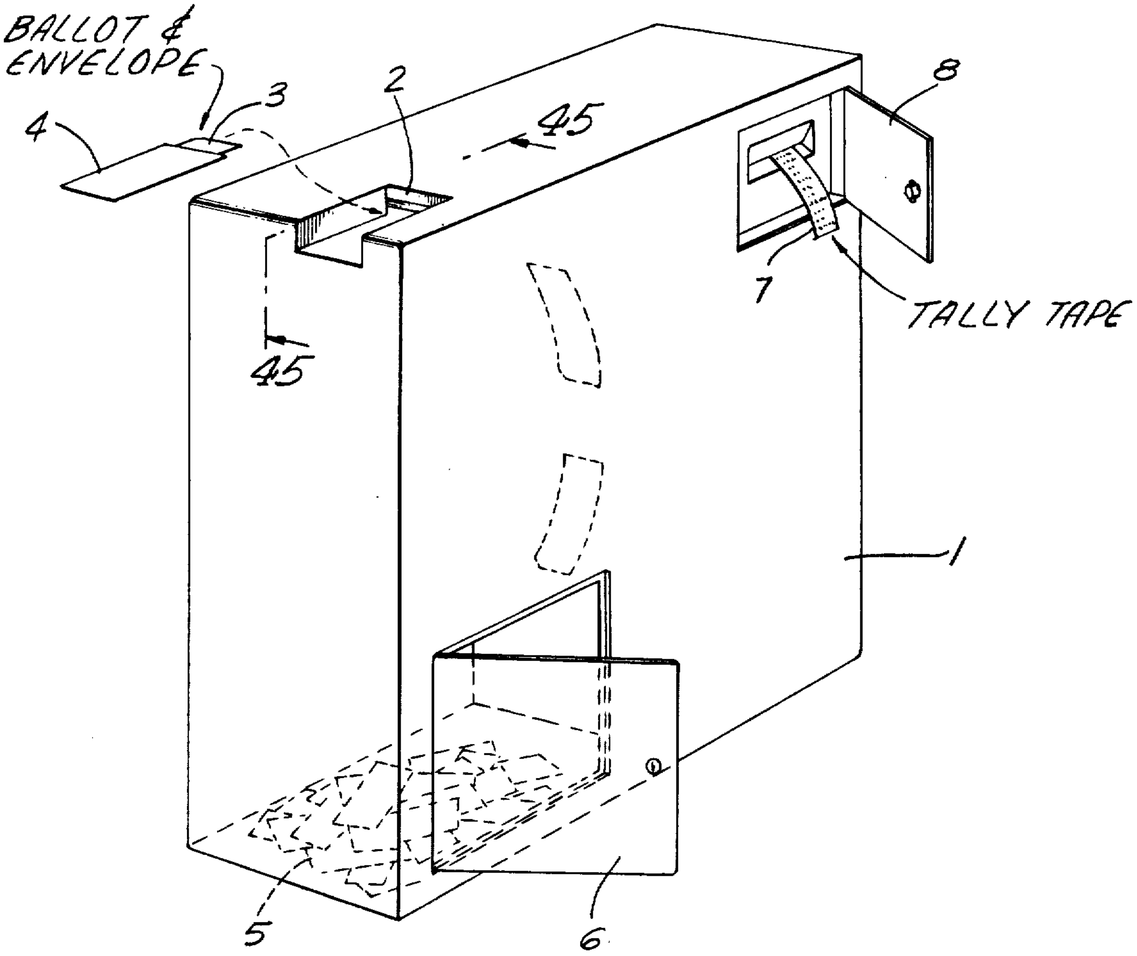

FIG. 44 is a perspective view of the "ballot box", partly in phantom.

Figure 45:
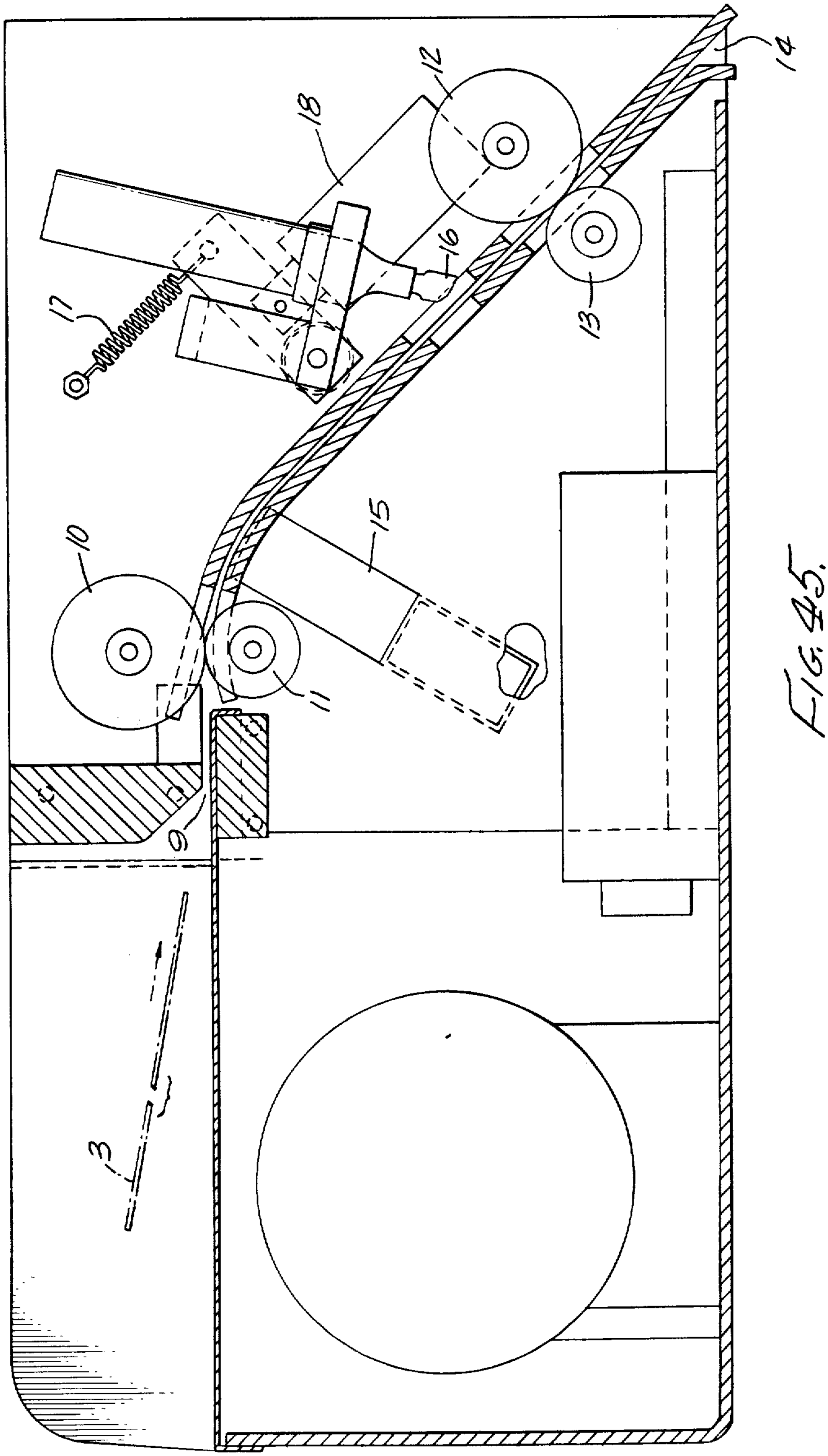

FIG. 45 is a view, partly in section, taken where indicated in FIG. 44, showing the card input and optical reading arrangement.

Figure 46:
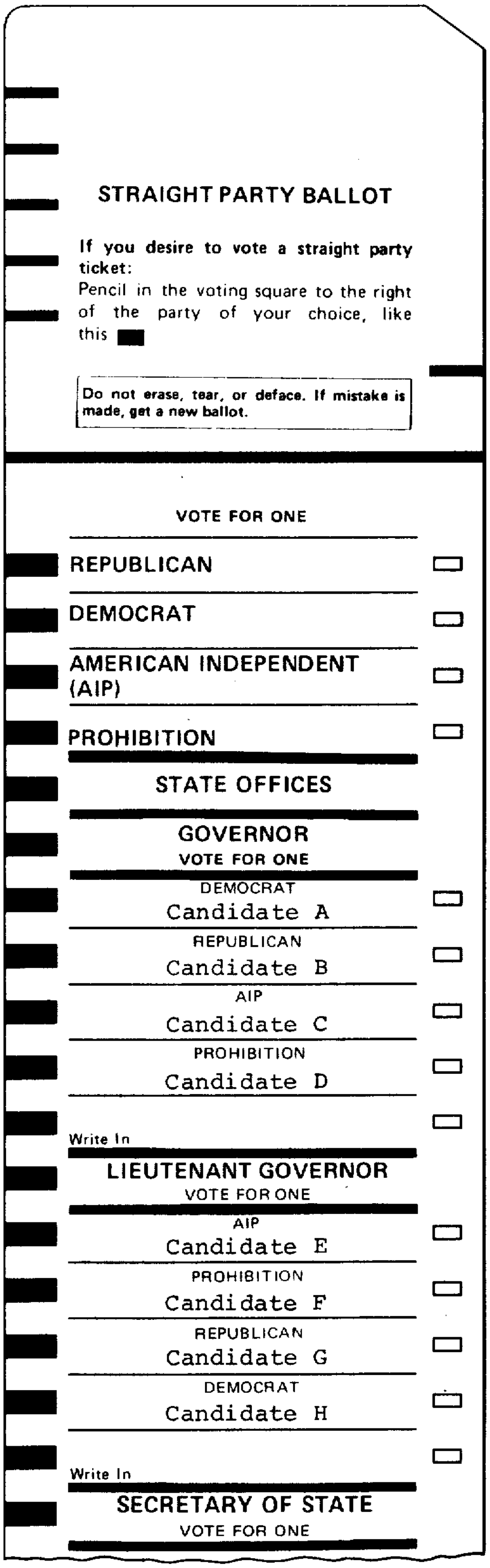

FIG. 46 shows a typical ballot usable in the inventive system, ready for marking by an individual voter.

Turning first to FIG. 44, this is a perspective view of the "ballot box" 1, which although generally box- or container-like in aspect embodies the entire system. 2 is an inlet for a ballot card 3, which is preferably in an envelope 4 sufficiently shorter than the ballot card 3 that the heading of the latter projects therefrom, although the marked portion of the card remains hidden from view.

As shown in phantom in FIG. 44, the ballot cards after passing through the reading mechanism to be described later fall to the bottom of the container, forming a heap behind a lockable door 6. When the day's ballot cards have been received and read by the system, a tally tape 7 is delivered after the lockable door 8 has been opened.

Turning next to FIG. 45, this shows a ballot card 3 (only a portion of its total length being shown in the drawing) about to be shoved into the throat 9 of the reading mechanism, where it will be taken up by the pair of rolls 10 and 11 and eventually by the second pair of rolls 12 and 13, finally being ejected from exit aperture 14 wherefrom it falls on the heap of cards 5 already described. The ballot cards should of course not be shorter than the spacing between the two sets of rolls, so that their travel will be positive. On the other hand, the ballot cards may be as much longer as needs be for the election slate. The ballot cards are fed in face down.

After passing through the first set of rolls 10 and 11, the ballot card passes over a two-channel optoelectronic sensor 15, which responds to relative blackness or lightness on the two edges of the ballot cards, and more particularly senses the black "clock" bars on the left-hand side of the card as shown in FIG. 46, and senses whether the voter has marked any of the boxes arrayed along the right-hand side of the card. The sensor is of a type commercially available and well known to those skilled in the art, and thus need not be described in detail. Each channel of the sensor shines a narrow light beam on to the card as it passes over, and senses the relative magnitude of the reflected light, the output being in voltage form.

The reading mechanism also contains a marking pen 16 normally retracted from the cards passing under by a spring 17, but which a solenoid 18 may cause to make a mark on the back of any defective or mis-cast ballot, as described more fully hereinbelow.

FIG. 46 shows the upper portion of a typical ballot card, with the reference of "clock" bars on the left-hand side, and boxes to be marked by the voter on the right-hand side, using for example a soft pencil.

The voltage signals supplied by the card reader in the fashion just described are the essential input to the electronic portion of the system, which is more fully explained in the following description taken in connection with the block diagram of FIG. 1, the flow diagram of FIG. 2, and the various circuit and logic diagrams of FIGS. 3–43 inclusive.

Those skilled in the art will have no difficulty in comprehending the operation of our system, indeed from the drawings alone. We have used terminology and symbolic notation standard in the art, as described for example in the following texts, which are hereby incorporated herein by reference:

Integrated Circuits in Digital Electronics, A. Barna et al., New York: Wiley, 1973.

Fundamentals of Digital Logic Circuit, S. Libes, Rochelle Park, New Jersey: Hayden, 1975.

Solid-State Devices Manual, Somerville, New Jersey: RCA Solid-State, Division, 1975.

Referring now to the sample ballot card of FIG. 46, an approximately 3 inch header portion will be observed which contains six code marks printed on the two sides of the ballot. The six code marks are spaced in sequence from the top of the ballot occurring on one side or the other but not simultaneously on both for six sequential positions. The bottom of the header is indicated by a pair of marks occurring in coincidence on each side of the ballot. In some cases a single solid bar may extend completely across the ballot. The voting portion of the ballot begins beneath the coincident marked pair. It will be observed that a series of equally spaced regular black marks occur down the left edge of the ballot. These marks are called clock marks and are used to indicate the location of possible voting squares. Down the right hand edge of the ballot will be observed a series of outlined rectangles indicating the voting positions for the given ballot. Marks may be placed within the rectangles to indicate the voter's choice. Marks may be made with a soft lead pencil or in jurisdictions where pencils are not permitted, black ink stamp marks may be utilized. A diagonal corner cut will be noted at the upper right hand corner of the ballot. This cut is utilized for ballot position indexing during the feeding process. This makes impossible the feeding of a ballot upside down or backwards.

The tallying system is made up of five subsystems which will be described in the following order. First is the ballot reader; second, the printer; third, the control logic; fourth, the memory system; and fifth, the power supply.

BALLOT READER

The function of the ballot reader is to feed and sense voters' marks on properly oriented ballots provided the polls have been properly opened as will be described later. The ballot reader must not feed ballots if the initial totals indicating zeros in all active memory positions have not been run, nor must it feed a ballot which is not properly oriented. Certain other checking features which will be described later will also prevent ballots from being accepted by the ballot reader. A number of conditions exist which will permit the ballot reader to feed a ballot but not read totals from it. Among these conditions are the occurrence of an improper header, the appearance of more than or less than the six code marks printed in the ballot header, extraneous marks on the clock track, or if no vote marks at all are seen on a ballot. Such ballots will have a mark striped on the back of the ballot by pen 16 as they are fed to indicate the fact that no totals have been entered from such a ballot.

The printer is located inside of the box behind tape 7, and is a coventional, commercially available printer and thus is not shown in detail.

The printer prints two sets of four digit numbers on a 2½ inch wide paper tape. The first four digit number is the identification number representing a particular candidate or issue vote. Second four digit number carries the total corresponding to each identification number. Totals typically are printed in black. Red print will preferably occur for the precinct identification number, for the listing of the total number of ballots read of each type and for the total number of ballots that were unread of all types. Also any total having a potential error as indicated by a parity check failure will be printed in red. All other data will be printed in black. The precinct identification number will utilize one print column and will print seven digits vertically down the print tape. This will be the first number printed on each printout.

CONTROL LOGIC

The control logic mechanizes the performance of all functions of ballot feeding, ballot reading and tallying, data checking, printing, and system interlocks. The system logic is contained on two main circuit boards, as described in detail later.

MEMORY

The memory system is divided into three sections. The main memory stores up to 1008 different totals, each having a maximum value of 3999. A ballot image memory stores the vote marks sensed from a single ballot until they are checked and updated into the main memory. The third memory is conveniently known as PROM. PROM stands for Programmed Read Only Memory. PROM serves as control memory for the MTBI. It defines the ballot format for a particular precinct in a given election and contains the precinct number identification which is printed out in red. It defines the number of votes allowed in each office and where each office begins and ends on the ballot. The PROM also contains data indicating the length of each ballot and which totals are to be printed out. It further indicates the location of write-in votes to enable outstacking of ballots which contain write-in votes.

POWER SUPPLY

The power supply as shown in FIGS. 38–43 inclusive generates all of the DC voltages required by this system. Four regulated voltages are provided and one unregulated DC voltage is generated. A battery pack is provided as part of the power supply to permit the preservation of totals in memory in the event of a power failure. It contains a charger which supplies charging current to batteries at all times the system is connected to AC power. Removal of AC power automatically switches memory prime power to the battery for maintenance of data.

SYSTEM FLOW DIAGRAM

Figure 2:
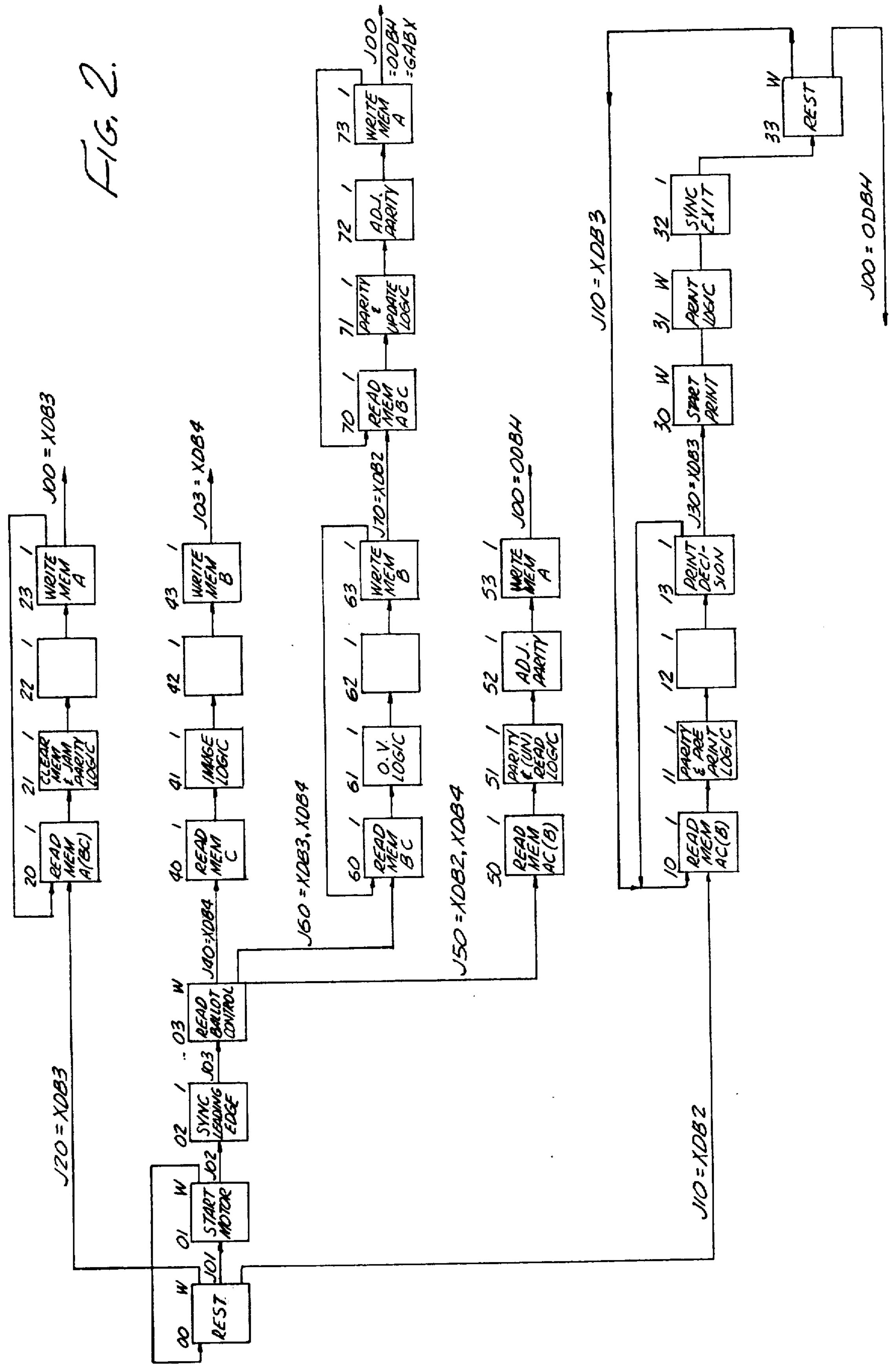
FIG. 2 is a flow diagram of the tallying mechanism.
Figure 3:
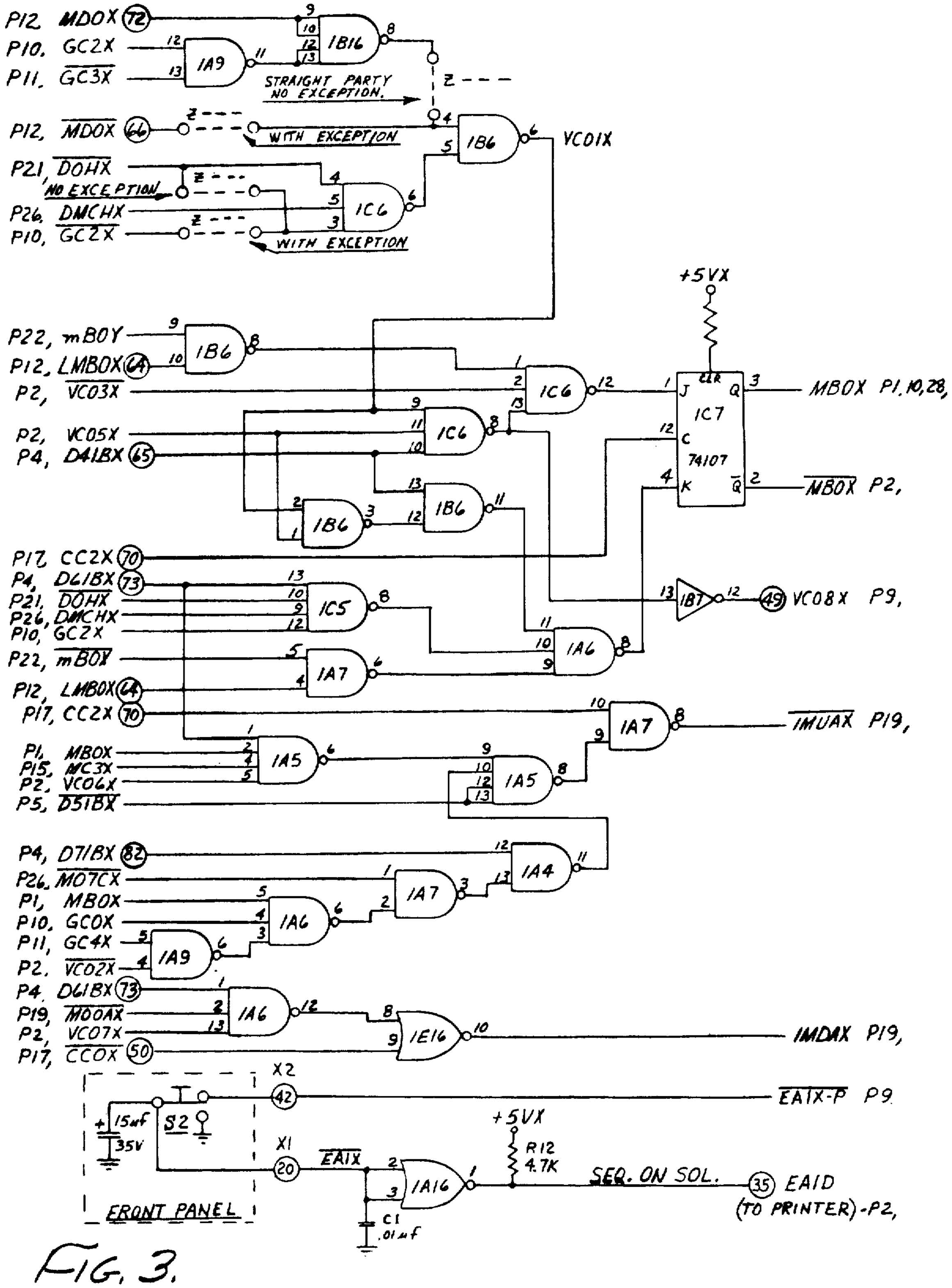
Figure 4:
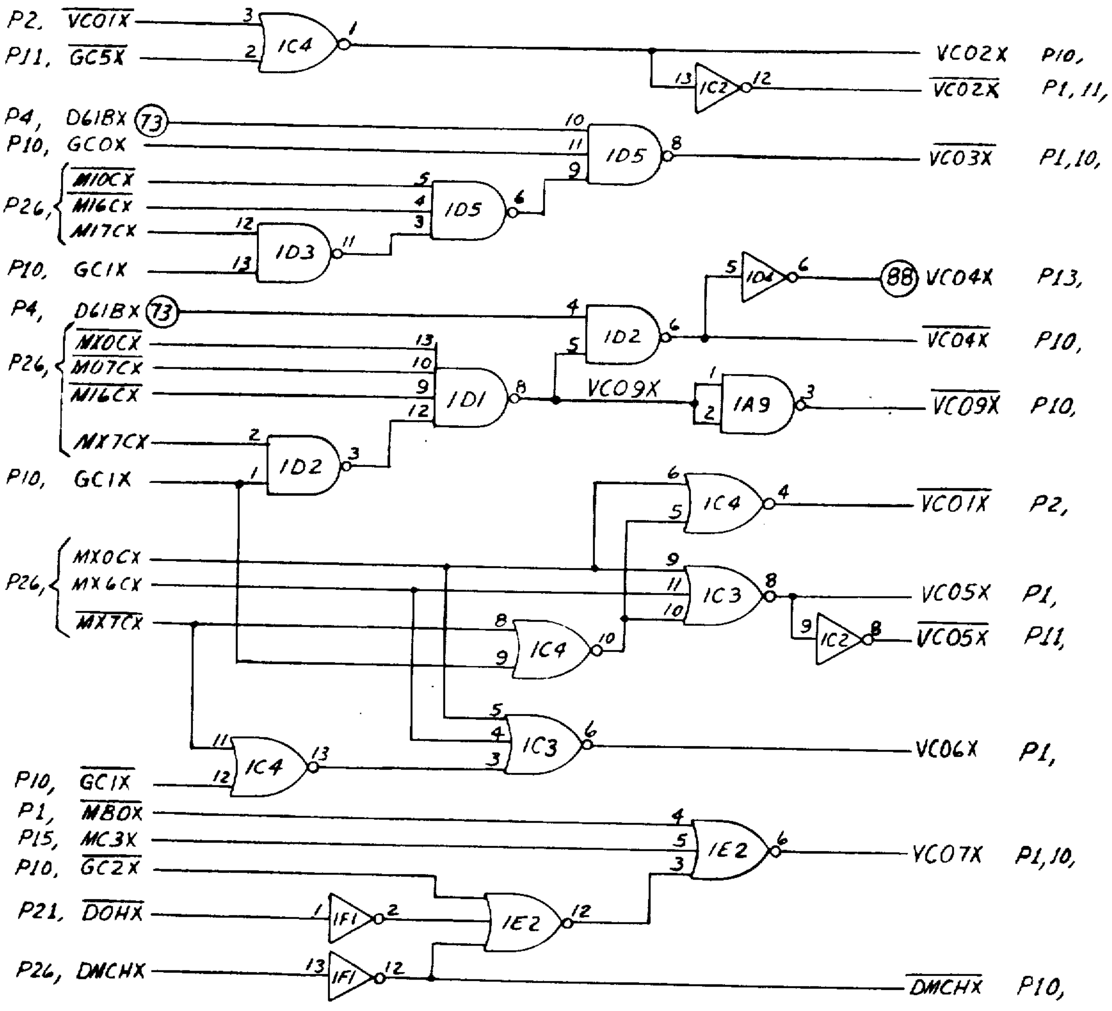

The sequence of operations controlling the MTBI are described completely in the system flow diagram of FIG. 2, together with the circuit and logic diagrams of the subsequent Figures. Each block on the flow diagram represents one stage of operation of the system. It will be noted at the upper left hand corner of each block that there is a two digit number. The number represents the state of the system program counter during the functions indicated in that block. At the upper right of each block will be found a 1 or a W. A 1 indicates that the function of that block occurs in a single clock period. A W indicates that the count will be held until some external condition is met which causes the program counter to change state to is next position. It will be noted in certain sections of the flow diagram that the program counter counts in order. At certain positions the flow lines will indicate a change of number to a state other than straight count. It should also be noted that the least significant digit of the program count has only four states: 0, 1, 2 and 3. The most significant digit of the program count may be observed to have eight different states: 0 through 7. Other logic terms which appear on the flow diagram will be discussed later in the detailed description of the control logic.

When the system is first turned on prior to use, the program counter will be forced to count 00. The system remains in that count as indicated by the W until a precinct official inserts a key into the front lock, turns the key and releases it. Upon release of the key, the program count is forced to state 20 (two-zero). At this time the memory address register is forced to page 0, line 1, or address 0001. In block 20 it states: read memory A, B, C, with B and C being in parentheses. Memory A refers to the main random access memory which stores totals. Memory B refers to the ballot image register and memory C refers to the PROM control memory. All three memories are addressed identically. B and C being in parentheses mean that those two memories are accessed but no use is made of the data coming from them. This is done whenever possible as it simplifies the control logic. Therefore, in the first excursion through block 20, the page 0, line 1 contents will be read from memory. This occurs in one clock period and the program counter advances to 21. Block 21 states: clear memory and jam parity logic. Data which were read out of main memory in block 20 will not be set to 0 and a parity bit will be set in the parity position. The program counter advances to count 22 where nothing is done and one clock period later it advances to block 23. Block 23 states: write memory A. The 0 data plus the parity bit which was set in that address is written back into memory address page 0 line 1. Upon leaving block 23 the address counter is incremented to page 0 line 2 and the program counter is forced to count 20 again. The same procedure is carried out for memory address page 0 line 2 and upon departure from block 23 the memory address is again incremented.

This procedure continues until all addresses have been set to 0 and the address counter returns to address page 0 line 0. When this occurs, that fact is sensed in block 23 and instead of returning to block 20 the program counter is forced back to block 0. But a flipflop is set in the system to indicate that the memory has been cleared and all totals are now 0. Having completed the clear memory process and returning to block 0, the program counter is forced to count 10. In block 10 it states: read memory A and C with B in parenthesis. The data from memories A and C are placed in their input-output registers where the contents of memory C will be examined. In program count 11 the contents of memory A are checked for parity. Contents of memory C will be checked to determine if any bit is true. If memory C contains any data other than 0 at that address the contents of memory A will be printed out. Assume for the first check that no data appears in memory C. The program counter steps through 12 to 13. Since no data is to be printed, the program counter is forced back to 10 and the address register is incremented as during the clear memory process. This cycle will be repeated until contents other than 0 are found in the control memory. A non-0 in the control memory will cause the program counter to advance from 13 to 30 which is the beginning of the print cycle. A one-shot is fired in block 30 which generates a start-print pulse to the printer. Upon timing out of the one-shot, the program counter advances to 31 which is also a wait block. When the motor drive to the printer has been started, it will emit a series of scan pulses in synchronism with the position of each sequential character on the print wheel. It is the first of these scan pulses which actually cause the program counter to step from 30 to 31. Each additional scan pulse causes the memory 10 counter to decrement until for each digit position the counter is equal to 0. The next scan pulse causes a borrow to occur. The borrow bit drives the print magnet so that the character occurring at this instant is printed for that column. One should note that the total main memory contents for the address being printed exists in parallel in the memory 10 register. The countdown and decrementing of each digit is occurring simultaneously across the printer columns.

When all scan pulses have been passed, the program counter will increment to 32 and to program count 33 which again is a wait block. In program count 33 a decision is made to determine if printing is complete. The address register is inspected and if not at address page 0 line 0, the program counter is reset to count 10. In the event that the address counter has cycled completely through its count and returned to page 0 line 0, the program counter will be set to 00, the rest block. A the program counter returns to block 10, the address counter is incremented and the process as described above is repeated for the next address in sequence. All addresses are sequentially processed in the same manner until address 00 occurs as described.

When the program counter returns to state 00, the MTBI is now ready to proceed with reading of ballots. Prior to this occurrence, an interlock prevents the feeding of any ballots through the system. The totals which have been printed out may be inspected by the precinct officials to assure that the contents of all active registers are 0. With the program counter in state 0 a ballot may be placed into the entry throat of the card reader. If the corner cut at the top of the ballot is sensed in the proper position, the program counter is forced to count 01. In program count 01 power is applied to the drive motor. If the card is positioned in the pinch rolls 10 and 11 it will feed until the leading edge is seen by the reading heads 15. When this occurs the program counter is forced to state 02 where a motor timing one-shot is fired before the program counter steps immediately to count 03. The program counter remains in count 3 until the six marks of the header have been sensed. Those marks occurring on the side of the mark head are given a binary value of 1. Those occurring on the clock side of the ballot are given a binary value of 0. A six bit binary number is thus generated which presets the page portion of the address counter. The common bar which is seen after the six bits have been sensed is used to check for the occurrence of six bits and terminates the header portion of the ballot. As the ballot progresses beyond this point, the mark and clock channels are seen independently and their functions are altered. During the balance of the ballot, a black mark on the clock side of the ballot opens a gate which permits a mark to be sensed on the mark side of the ballot. Any mark which is thus detected is transferred to a collector register which consists of a single flipflop. Completion of sensing of the common bar, the transition from black to white, causes the program counter to transfer from 03 to 40. In program count 40 the control memory is read. In program count 41 the instruction from PROM is checked and the collector register is examined. If the PROM indicates an active voting square, the 10 register for the image plane is set according to the contents of the collector register. The program counter steps through count 42 where nothing is done and enters program count 43 where the contents of the image plane 10 register are written into the image plane memory. The exit from program count 43 causes the program counter to return to count 03 as the address register is incremented. From what has just been stated, it may be noted that the collector register has been set for any mark seen on the ballot but the mark is not placed into the image plane 10 register unless so directed by the control memory. While in program count 3 again waiting for a clock mark, the transition from black to white will cause the program counter to again enter count 40. During the black period of the clock, whatever is seen by the mark head will be read into the collector register. The clock mark transfers from black to white, the program counter again is set to program count 40. The same sequence is followed for each ballot clock until the program in PROM indicates the end of ballot. When program count 43 is exited at the end of ballot address, the jump to program count 3 will set a condition which will cause another routine to be followed. The image plane of memory now contains an image of all marks sensed under control of the PROM for the ballot just passed. Having completed this procedure, the program counter is forced to count 60 where the overvote check is started for the ballot just read. At present, it will be assumed that no erroneous process had occurred during the reading of the ballot. When that fact is determined with the program counter at count 03 is it immediately set to program count 60. At this time the address register is at the page and line address corresponding to the bottom of the ballot. The block for program count 60 indicates reading of the control memory and the ballot image memory. In program count 61 the overvote logic is performed. Since in program count 60 the main memory was not utilized, the main memory 10 register is now used in performance of the overvote logic. During program count 61 the main memory 10 register is split in two parts. One part maintains count of the number of pages; the other part carries out the detailed logic in the following manner. If at a given address a PROM bit known as the demarcation bit occurs and no vote occurs, that portion counts up. If a demarcation bit occurs and a vote occurs, no count is made. If a vote occurs and no demarcation bit is seen in control memory, a count down occurs. If this counter overflows negative, that is, a borrow bit occurs, it indicates that more votes have appeared for an office than are permitted, and a flipflop indicating this borrow is set. When the PROM indicates the overvote position at the top of the office, a flag is set for the ballot image plane. The program counter steps through 62 where nothing is done, to program count 63 where the bit is written into the image plane for an overvote flag. The program counter continues to cycle through program counts 60 through 63 until the address counter is at line 0 of the starting page. When this address has been processed through program count 63, program counter will then step to program count 70. In program count 70 all three memories are read. Contents of the main memory are loaded broadside into the 10 register to be held either static or for incrementing should a valid vote appear. If the memory address being read is an overvote storage position as indicated by the PROM, the image plane is inspected to determine if a flag bit is present. Should a flag bit be noted, the count at that address in main memory is incremented, indicating one additional overvote. A flipflop is set which inhibits updating of any totals for that office or measure; when no overvote flag is observed at the beginning of an office or measure, votes observed in following position will be updated until the end of that office or measure. To summarize the logic carried out in program count 71: a bit observed at the office header position updates the total at the header position which is the overvote count and locks out all totals following for that office or measure. If no bit is observed at the header position, that address is not updated but all votes following within that office or measure are updated. In program count 72 a parity bit is adjusted if the memory total has been altered and the program counter steps to 73 where the totals in the main memory 10 register are written back into the main memory. If the PROM code observed in program count 71 did not indicate end of ballot, the program counter will step from count 73 back to count 70 and the sequence of 70 through 73 will be repeated on a cyclic basis until the end of ballot indication occurs. When program count 73 is reached following the detection of end of ballot code in program count 71, the program counter will be set to 00 and the processing of that ballot will have been completed.

Consider now the situation where during the reading of the ballot in program count 3 for the header or in the 40's during the reading of the main portion of the ballot an error is detected. Then from program count 3 rather than advancing to program count 60 for the overvote check and 70 for the updating of memory, the program counter will be forced to program count 40. This situation will occur in the event of a blank ballot or a missing or extra clock mark sensed on the ballot or if the six bits of header data are not properly detected. The process of stepping from program count 3 to program count 50 causes a reset of the page and line counter so that program count 50 is entered with the register at page 0 line 0. In program count 50 memories A and C or the main memory and the control memory are read. The program counter steps to program count 51 where the parity of the main memory 10 register is checked and the contents of memory address page 0 line 0 are incremented. The program counter steps to 52 where the new parity adjustment is made. And then to program count 53 where the data now in the main memory 10 register are written back into memory at address page 0 line 0. The program counter following this operation returns to program count 0 awaiting the next ballot.

It should be noted that at the time the error which caused the unread is detected, the flipflop which stores the error condition directly drives the unread marker solenoid 17 so that the ballot which is not to be read will have a stripe painted on the back by pen 16 to facilitate later identification and removal.

The foregoing has briefly summarized the occurrences at each step of the program counter sequence. These functions will be considered in greater detail in the sections which follow.

SYSTEM RULES AND CONVENTIONS

The bulk of the inventive system logic is mechanized, using standard 7400 series TTL integrated circuits. Logic levels are represented by a voltage of 2,4 to 5 volts for logic 1 and a voltage less than 0.4 volts for logic 0. Logic terms are stated as functions having alphanumeric designators which provide some indication of the type of function provided. All such functions have one of two values: 1 or 0, also referred to as true or false respectively. The classification of terms is listed in Table 1. Typical logic terms contain two alphatbetic characters followed by a one or two digit numeral and terminated usually with the letter X. The terminal letter may occasionally be Y. Y distinguishes a term which is logically identical to a similarly named X term but is generated by different circuits. Since the use of Y is rare, logical terms may sometimes be referred to without expressing the final X; such as DBO, GA1, $\overline{\text{EP2}}$. In some cases the numerals are replaced with other letters. Decoded counter outputs are designated with the decoded count immediately following the D with other alphabetic characters following the numerals. For example, the program counter is made up of flipflops DBOX, DBIX, DB2X, DB3X and DB4X. From these five flipflops 32 different count states occur out of which 20 are separately decoded. For example, program count 03 is given the signal name DO3BX. A bar is used over a term to signify inversion. Thus, $\overline{\text{DO3BX}}$ is of logic value 0 when DO3BX is of logic value 1 and vice versa.

System timing is controlled by the system clock which operates at a frequency of 500 kilohertz. Memory addressing is organized to correspond directly to the ballot format. Addresses are listed in terms of page and line using octal notation. Decimally speaking, the memory contains 64 pages of 16 lines each. The first page or page 00 is only used to store a seven digit precinct identification number and the total number of ballots of all types that were fed but not read by the system. The remaining 63 pages are available for ballot totals giving a total of 1,008 active storage locations. Memory addresses listed in octal range from 0000 (page 0 line 0) to 7717 (page 77 line 17). Note that three digits may have the entire octal digit complement 0 through 7, while the second least significant digit will be either 0 or 1. Any ballot longer than 16 lines will cause the page address to be incremented as required every 16 lines. The starting page address of each ballot is encoded in the ballot header. It should be noted that the page numbers appear on the relevant Figures.

SYSTEM PROGRAMMING

The system may be programmed for each precinct corresponding to the ballots to be read in that precinct. As described previously, the memory is addressed in ballot format terms, that is, by page and line. Each ballot position has a corresponding main memory address for storage of totals. A ballot image location for votes from the immediate ballot being read and a four bit code located in the PROM at that address control the system operation with data at that ballot position. Every possible ballot address will therefore have one of 15 possible code patterns. Table 2 shows the PROM codes and their definitions. The following example shows the programming for the ballot presented in FIG. 1. It will be noted that the header has a true bit in the 04 position defining the ballot starting memory address as page 04 line 00. Page 00 of memory must be programmed for every set of ballots to be used in any precinct combination. The program for page 00 contains seven digits for precinct identification which is printed out at the beginning of each printout. The digits are encoded in binary coded decimal in lines 01 through 07 of page 00.

An analysis will serve to firm the basic rules for programming of any office. The most significant bit of the binary program code is referred to as the ballot demarcation bit. The function of the demarcation bit was described in the description of the program counter operation. The number of sequential demarcation bits starting from the bottom of any office or measure determines the number of votes allowed. The office or measure continues upward until program code 1000 is reached, which represents the first position above the top voting square of an office or measure. It is at this address that the number of overvotes for that office or measure is stored.

LOGIC MECHANIZATION

In describing the mechanization of the logic involved in the inventive system operation, reference will be made to the 28-page logic diagrams of FIGS. 3—30 inclusive. The gate symbols and logical elements illustrated in this logic diagram are drawn using industry standard symbols, as already explained.

The physical elements utilized for realization of the logic are comprised of standard 7400 series TTL logic elements. Such circuits operate on a power supply voltage of +5 volts and ground. Three different regulated +5 volt sources will be noted on the diagram. They are identified as +5 VB, +5 VM and +5 VX. +5 VB is the 5 volt regulated from the battery contained in the system for preservation of totals in the event of power failure. +5 VM is the same as +5 VB except that it has been routed through the cam operated key switch used for initial zero total printout at the beginning of the day. +5 VX provides the main system power and is provided from the AC power connected power supply.

CLOCK GENERATOR

Master timing for the system is provided by the system clock which operates at a frequency of approximately 500 kilohertz. The timing generator for the system clock is illustrated on page 16, FIG. 18, where terms TCOX and TCIX are formed. TCOX times the high voltage period of the clock while TCIX controls the low voltage time interval of the clock signal. The 74123 is a dual one shot shown here in an interactive triggering mode. The resistor and capacitor on the TCOX one shot provide an on time of approximately 500 nanoseconds. The RC components on the TCIX one shot provide an on time for TCIX of approximately 1500 nanoseconds or 1½ milliseconds. The triggering for each side of the one shots occurs at the B input on the B input on pins 2 and 10. The logic table for the 74123 shows that a rising voltage at the B input causes triggering of the one shot. Each bar term of the two one shots is presented to the B trigger input of the opposite one shot. In this way as each bar term voltage rises, which will occur at the end of the timing interval, the opposite one shot is triggered and begins its timing. In this way, as soon as power is supplied the two one shots become free running and continuously generate the timing intervals. It will be noted that the clock one shots are powered from +5 VM. Since this voltage is available from the battery and through the start-up key switch, the clock signals are available when the main power +5 VX becomes available. Pin 11 of the clock one shot is the clear input for the TCIX position. A low signal on this pin will clear and reset the one shot. The signal $\overline{\text{TAOX}}$ which is applied to this point, causes clock timing to be inhibited during the reset interval. The outputs of the clock generator one shot are applied to driver circuits as indicated on page 17, FIG. 19. These circuits provide sufficient power to drive the number of clock inputs required by the various flipflops. It will be noted that $\overline{\text{TCOX}}$ and TCOX both are inverted to supply drive to different locations. This provides two signals in exact opposite phase. The signal selected depends on the phase and timing required by the point being driven. The two input NAND gates which are used with the two inputs tied together were chosen in order to provide sufficient drive for the outputs. They are buffer type NAND gates which drive higher loads than other standard circuits.

PROGRAM COUNTER

Figure 5:
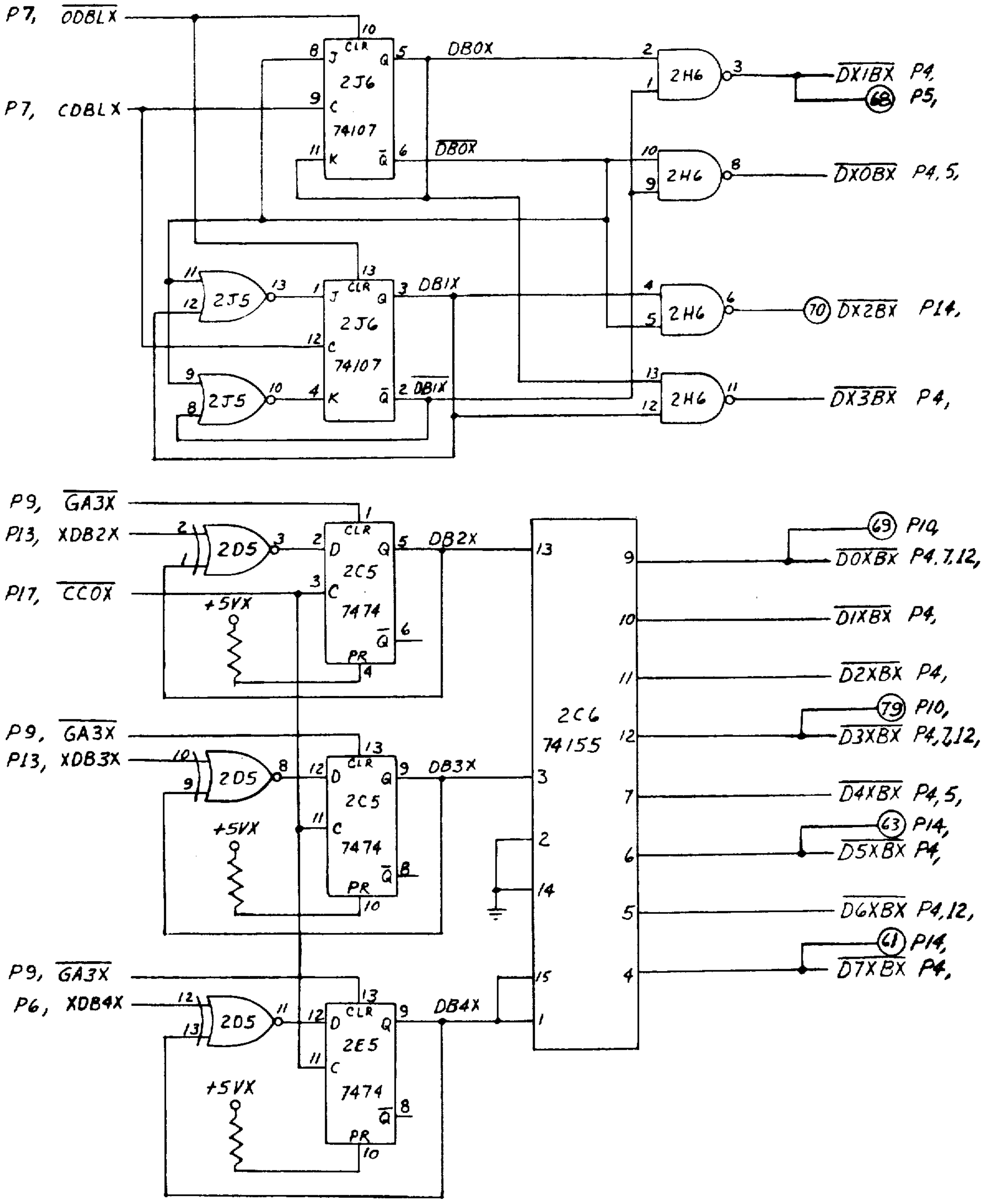
Figure 6:
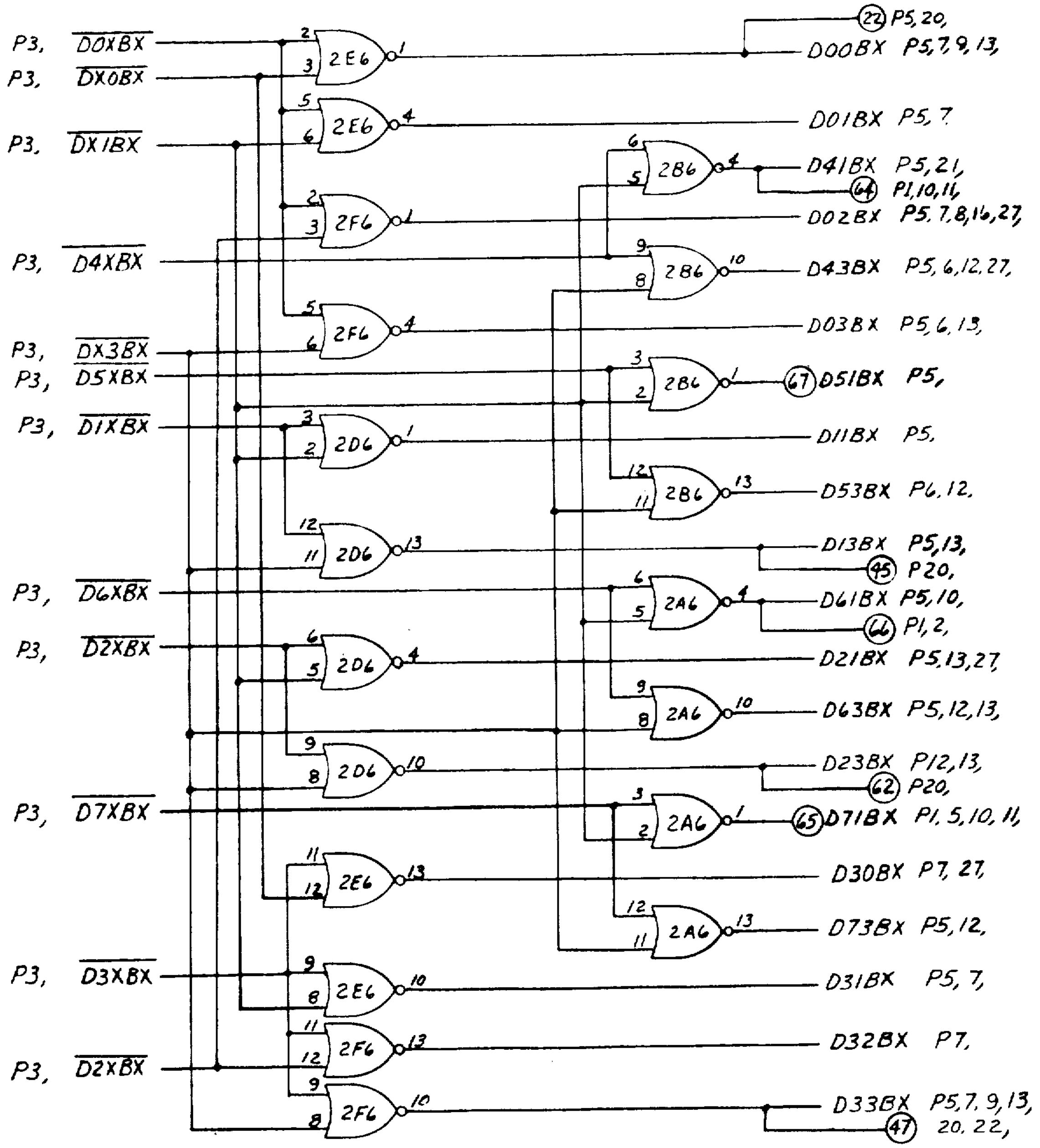
Figure 7:
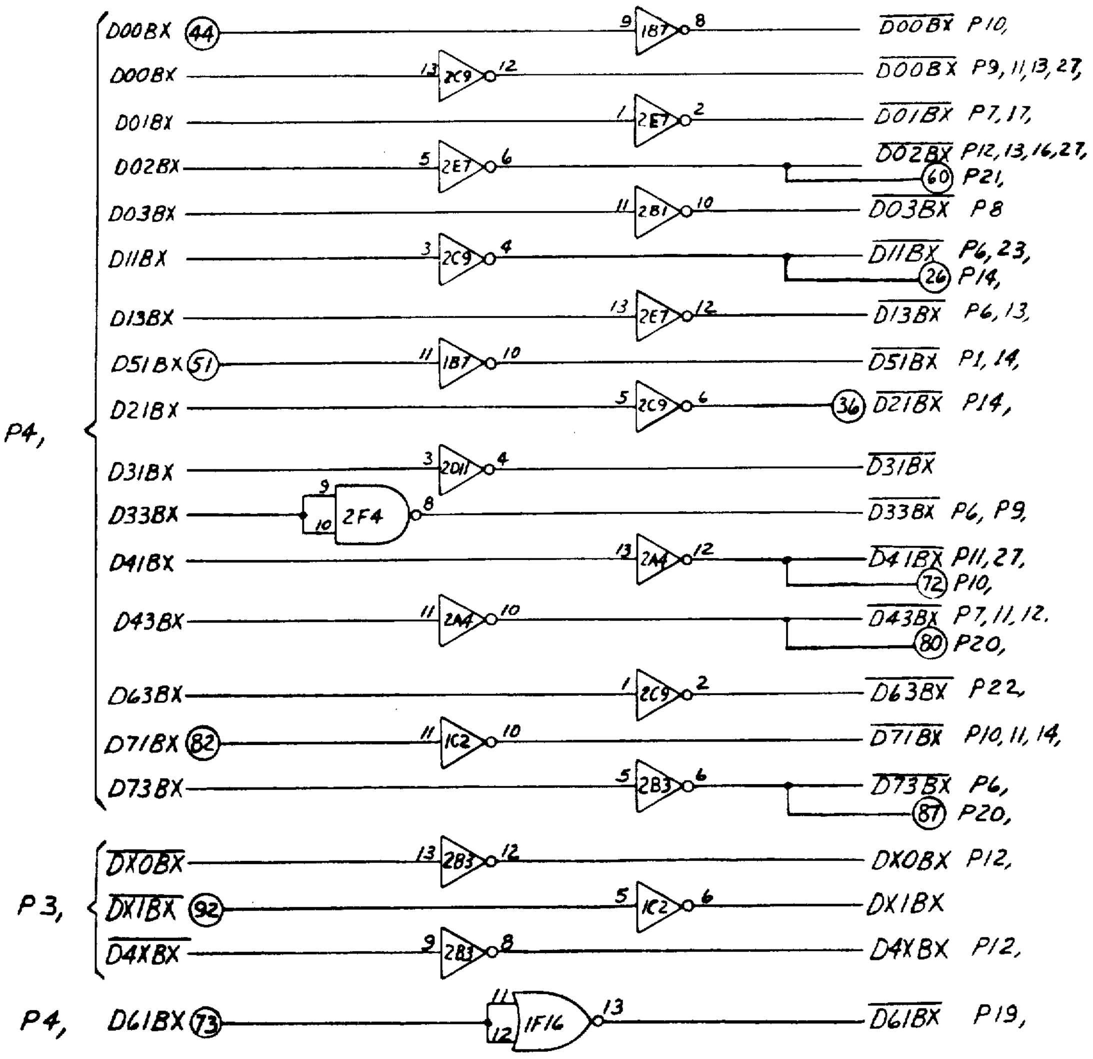

The program counter logic diagram will be found on page 3, FIG. 5. It will be noted that the program counter is divided into two portions. At the top of the page will be found the DBOX and DBIX flipflops. These two flipflops provide the low order four counts of the program counter. Toward the bottom of the page will be found three flipflops forming DB2X, DB3X and DB4X. The combination of these three flipflops provides the high order full octal digit of the program count. That is, count 0 through 7 in the most significant digit.

Let us first examine the low order two flipflops. They are made up of the 74107 type flipflop which is known as JK form of flipflop. At the top of the page on the left will be found the input term $\overline{\text{ODBLX}}$. This term when low will clear both flipflops to their 0 state. The clock signal for these two flipflops is labeled CDBLX which represents clock, DB counter, L for low portion. This clock is formed logically from the clock signals described previously so as to appear only when stepping through of the four low order counts is desired. If the gating logic permits, CDBLX could run continuously at clock frequency and DB0 and DB1 would count at clock frequency. The counts would generate the low order, 0, 1, 2, 3, and repeating 0, 1, 2, 3. The three high order bits of the program counter are formed using 7474 type flipflops which are known as D type flipflops. A D type flipflop transfers data at the D input terminal to the output following the dual transistion of the clock pulse. Each D input on these three flipflops is driven by an exclusive OR gate. The exclusive OR gate will be true if one or the other but not both inputs are true. Or in other words, if the inputs to the exclusive OR are different, the output will be true. The logic controlling the exclusive OR gates are XDB2X, XDB3X, and XDB4X. The XDB terms logically state: change the state of this flipflop. Rather than providing a set one or a set zero input, these flipflops are instructed when their state should be changed to the opposite condition. On the flow diagram, there are indicated XDB terms between the various blocks of four program counts. For example, from program count 00 to program count 20, the transition is made by XDB3. The low order digit is unaffected but the DB3 state is changed in this instance from 0 to 1. Out of program count 23 will be noted another XDB3. In this instance the DB3 flipflop will be changed from 1 to 0 or from true to false. The other input to each exclusive OR gate is the output of the flipflop to be changed.

Looking at the DB2X term, if DB2X is one and XDB2X occurs, we have one on each of the two inputs of the exclusive OR which will make its output false or zero. Zero data will then be strobed into the DB2X flipflop or its state will have changed. If the DB2X term is false or zero, its input to the exclusive OR gate will be zero, the XDB2X term will be one and the output of the gate will be true or one and one will be strobed into that flipflop. Thus it is shown that the state of the flipflop is changed whenever the XDB term is true. The low order and high order portions of the program counter are separately decoded as shown on the right-hand side of page 3. At the top of the page, four two-input NAND gates combine the output of the two flipflops to provide four signals, one of which will be low for each combination. The term designations here are of importance. As indicated in term conventions, when D is followed by two numeric digits it indicates a decoded output. The B following indicates the DB counter is involved. In this case the digit following D is an X. The X indicates that any high order digit may be true and the term is still valid. Similarly, toward the bottom of the page will be found eight outputs of the $\overline{\text{DOXBX}}$ format where one of the eight will be true for each program count. In these terms the second digit X is utilized to make the decode independent of the state of the low order count. The octal decode is formed in the 74155 binary coded decimal decoder. The BCD decoder was utilized because of the unavailability of a straight octal decoder and the three low order bits of the binary coded decimal decode in identically the octal format. The three bit binary input is formed from DB2X, DB3X and DB4X. A number of specific program counts are formed as shown on page 4. Combinations of the low order and the high order decodes are made to provide whichever program count decoded terms are required. All such decodes are indicated on that page.

LOGIC DETAIL

When the system power is turned on, a reset condition must occur to assure the system being in program count 00 with the address registers also cleared to 00. On page 9, FIG. 11, in the middle of the drawing, the term TAOX is shown. TAOX is the reset one shot. It will be noted that the trigger input to TAOX comes from +5 VX which is the main system 5 volt power supply. The timing components were powered by +5 VB and were therefore on from the time the battery was connected. When the 5 volt supply rises on connection of power, a reset pulse will occur, positive pulse TAOX. To the left will be seen a reset push button which is housed near the logic board so that the system may be reset by internal access to the logic mechanism. Pressing the reset button removes ground from the 0.1 microfarad capacitor allowing it to charge to a positive value. The A input to the one shot triggers on a falling voltage. When the reset button is released the capacitor is grounded, the voltage falls and the reset pulse occurs. At the top of page 9, FIG. 11, the GAOX flipflop will be noted. GAOX receives its power from +5 VM which is derived from the battery supply. GAOX flipflop has the function of indicating when one printout has been obtained showing a zero total. Prior to GAOX going true, no cards may be read by the card reader. When power comes on, GAOX must be in the cleared or bar condition. The inverter and RC network entering the clear line of GAOX causes GAOX to come on in the cleared state when the voltage is applied.

Figure 8:
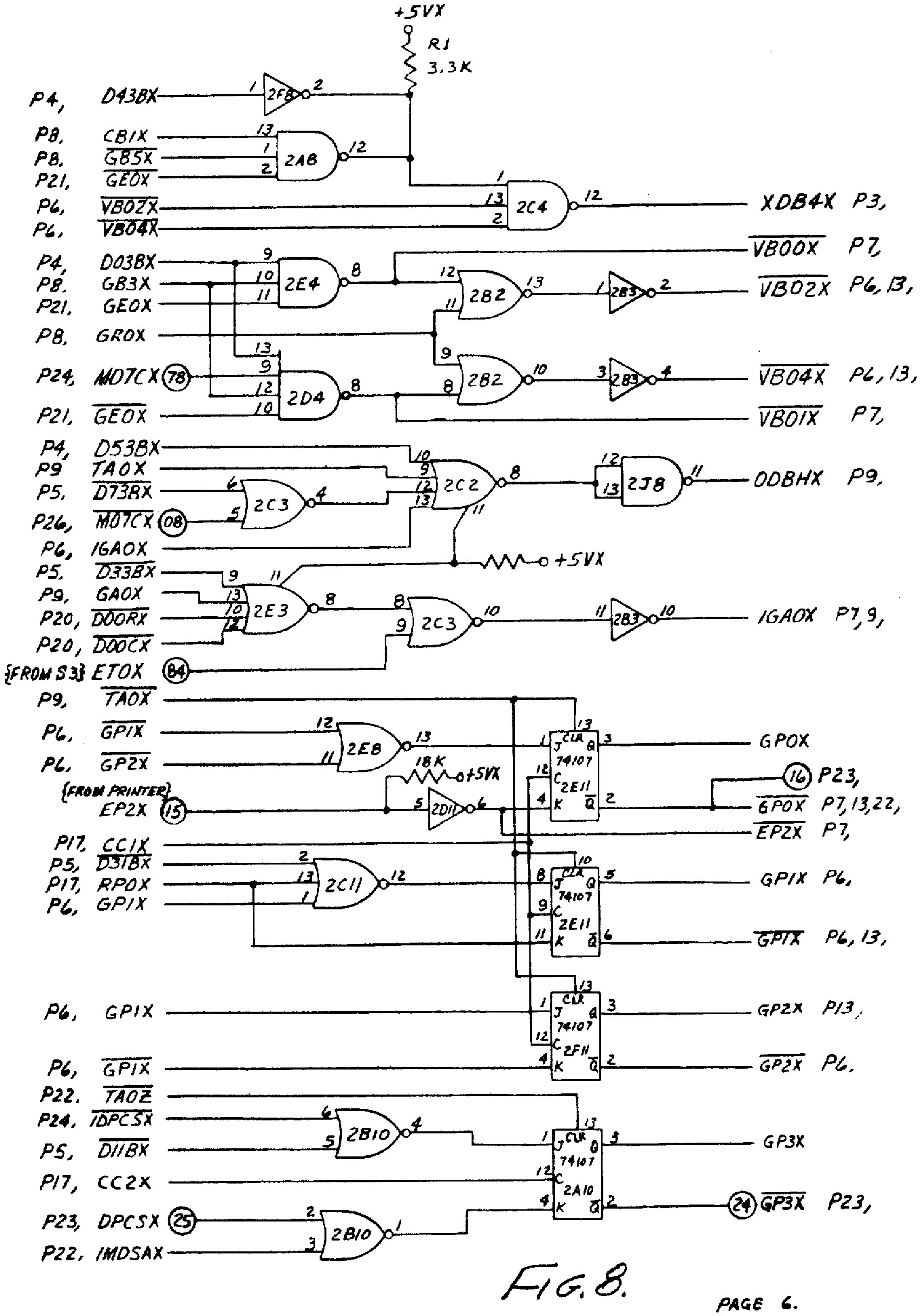

The resetting of the program counter to 00 can be followed by tracing TAOX to page 6, FIG. 8, where it enters approximately one-third of the way down the drawing into gate labeled 2C2. Through the inversion of this gate and the inversion of the gate following it, the term ODBHX is formed. This stands for: set to 0, DB high order count. Following this term back to page 9, it will be seen that it becomes the J input to the 74107 JK flipflop. When the J input is high or true, the next clock pulse will cause GA3X to be set high and $\overline{\text{GA3X}}$ to be set low. The low term $\overline{\text{GA3X}}$ may now be traced to page 3 where it will be observed to form the clear term for DB2X, DB3X and DB4X or the high order of the program counter.

TABLE I

LOGIC TERM CONVENTIONS

C — Clock
- CB — Ballot Clock
- CC — System Clock
- CC — System Clock
- CD — Counter Clock D — Counter
- DB — Program Counter
- DC — Column (Page) Address Counter
- DH — Housekeeping Counter
- DP — Special Printer Counter
- DR — Row (Line) Address Counter E — Mechanical Switch Contact
- EA — System related (i.e., Power Switch)-Manually activated
- EP — Printer activated G — General Purpose Flip-Flop
- GA — System related GB — Ballot related
GC — Control or Control Memory related
GE — Error related
GP — Printer related
GR — Reader related
J — Jump
L — Load
M — Register
MA — Main Memory 1/0 Register/Counter
MB — Ballot Image Memory 1/0 Register
MC — Control Memory 1/0 Register
MD — Ballot Data Register
R — Row Data - Unsynchronized
RB — Ballot signals
RR — Reader signals
RP - Printer signals
S — Select
SMA — Select Memory A
SMB — Select Memory B
SMC — Select Memory C
SP — Select Printer
T — Timing one-shot
TA — System Related
TB — Ballot Related
TC — Clock Related
TP — Printer Related
TR — Reader Related
V — Partial Function
VB — Program Counter Related
VC — Control Memory or Control Flip-Flop Related
W — Write/Read
WMA — Write Memory A when false: Read Memory A when true
WMB — Write Memory B when false: Read memory B when true TERM PREFIXES
O — Reset, clear, set to zero, i.e., ODRCX
I — Set, enable, set to one, i.e., IGC3X
X — Change the state of, i.e., XDB4X

TABLE 2

PROGRAM CODES

| PROM Code (Octal) | | PROM Code (Binary) | | Definition |
|---|---|---|---|---|
| 00 | | 0000 | | Inactive position |
| 01 or | 11 | 0001 or | 1001 | Non-partisan active position |
| 02 or | 12 | 0010 or | 1010 | Party A (for straight party vote) |
| 03 or | 13 | 0011 or | 1011 | Party B (for straight party vote) |
| 04 or | 14 | 0100 or | 1100 | Party C (for straight party vote) |
| 05 or | 15 | 0101 or | 1101 | Party D (for straight party vote) |
| 06 | | 0110 | | Scratch (by-pass this position) |
| | 16 | | 1110 | Over-vote storage location for straight party selection. |
| 07 | | 0111 | | "End of ballot" location. May also be used to cause printout of page 00 line 00 containing "Total ballot cards unread". |
| | 17 | | 1111 | Over-vote storage location for "Recall" issue and last active recall position. |

TABLE 3

PROGRAM COUNTER DECODER

| D D D B B B 4 3 2 X X X | D D B B 1 0 X X | Octal Program Count |
|---|---|---|
| 0 0 0 | 0 0 | 00 |
| 0 0 0 | 0 1 | 01 |
| 0 0 0 | 1 0 | 02 |
| 0 0 0 | 1 1 | 03 |

TABLE 3-continued

PROGRAM COUNTER DECODER

| D D D B B B 4 3 2 X X X | D D B B 1 0 X X | Octal Program Count |
|---|---|---|
| 0 0 1 | 0 0 | 10 |
| 0 0 1 | 0 1 | 11 |
| 0 0 1 | 1 0 | 12 |
| 0 0 1 | 1 1 | 13 |
| 0 1 0 | 0 0 | 20 |
| 0 1 0 | 0 1 | 21 |
| 0 1 0 | 1 0 | 22 |
| 0 1 0 | 1 1 | 23 |
| 0 1 1 | 0 0 | 30 |
| 0 1 1 | 0 1 | 31 |
| 0 1 1 | 1 0 | 32 |
| 0 1 1 | 1 1 | 33 |
| 1 0 0 | 0 0 | 40 |
| 1 0 0 | 0 1 | 41 |
| 1 0 0 | 1 0 | 42 |
| 1 0 0 | 1 1 | 43 |
| 1 0 1 | 0 0 | 50 |
| 1 0 1 | 0 1 | 51 |
| 1 0 1 | 1 0 | 52 |
| 1 0 1 | 1 1 | 53 |
| 1 1 0 | 0 0 | 60 |
| 1 1 0 | 0 1 | 61 |
| 1 1 0 | 1 0 | 62 |
| 1 1 0 | 1 1 | 63 |
| 1 1 1 | 0 0 | 70 |
| 1 1 1 | 0 1 | 71 |
| 1 1 1 | 1 0 | 72 |
| 1 1 1 | 1 1 | 73 |

Figure 9:
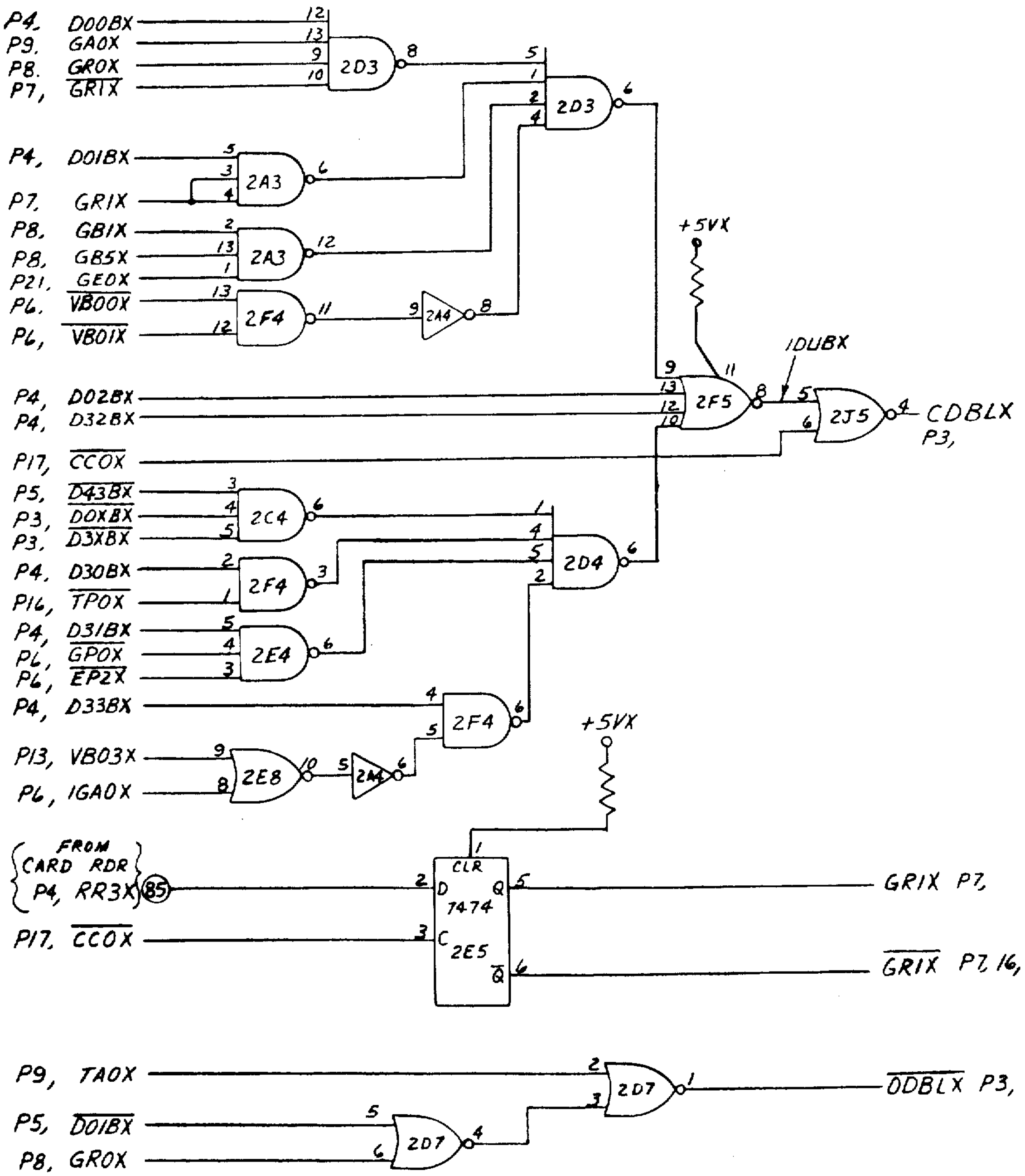
Figure 10:
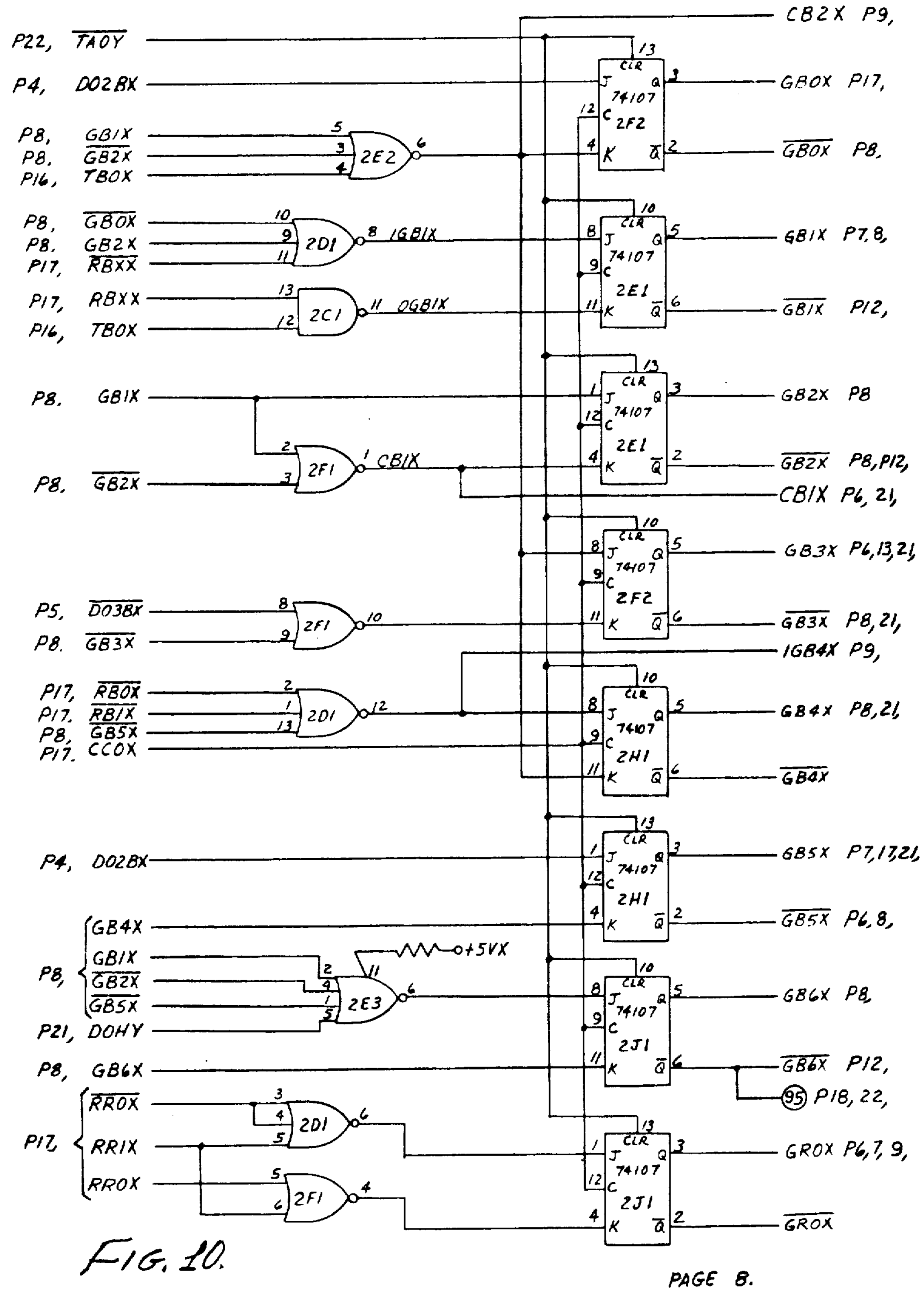
Figure 11:
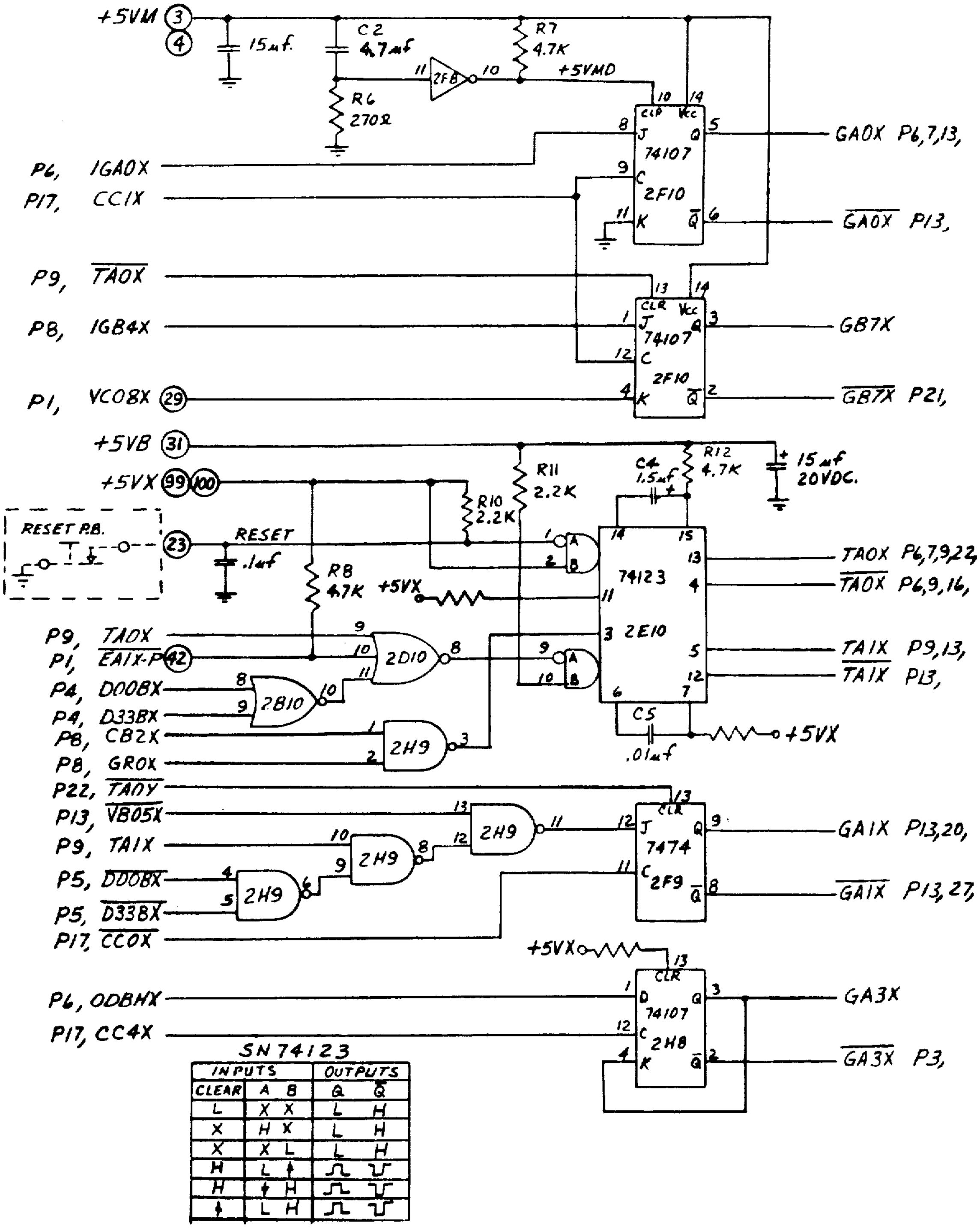
Figure 12:
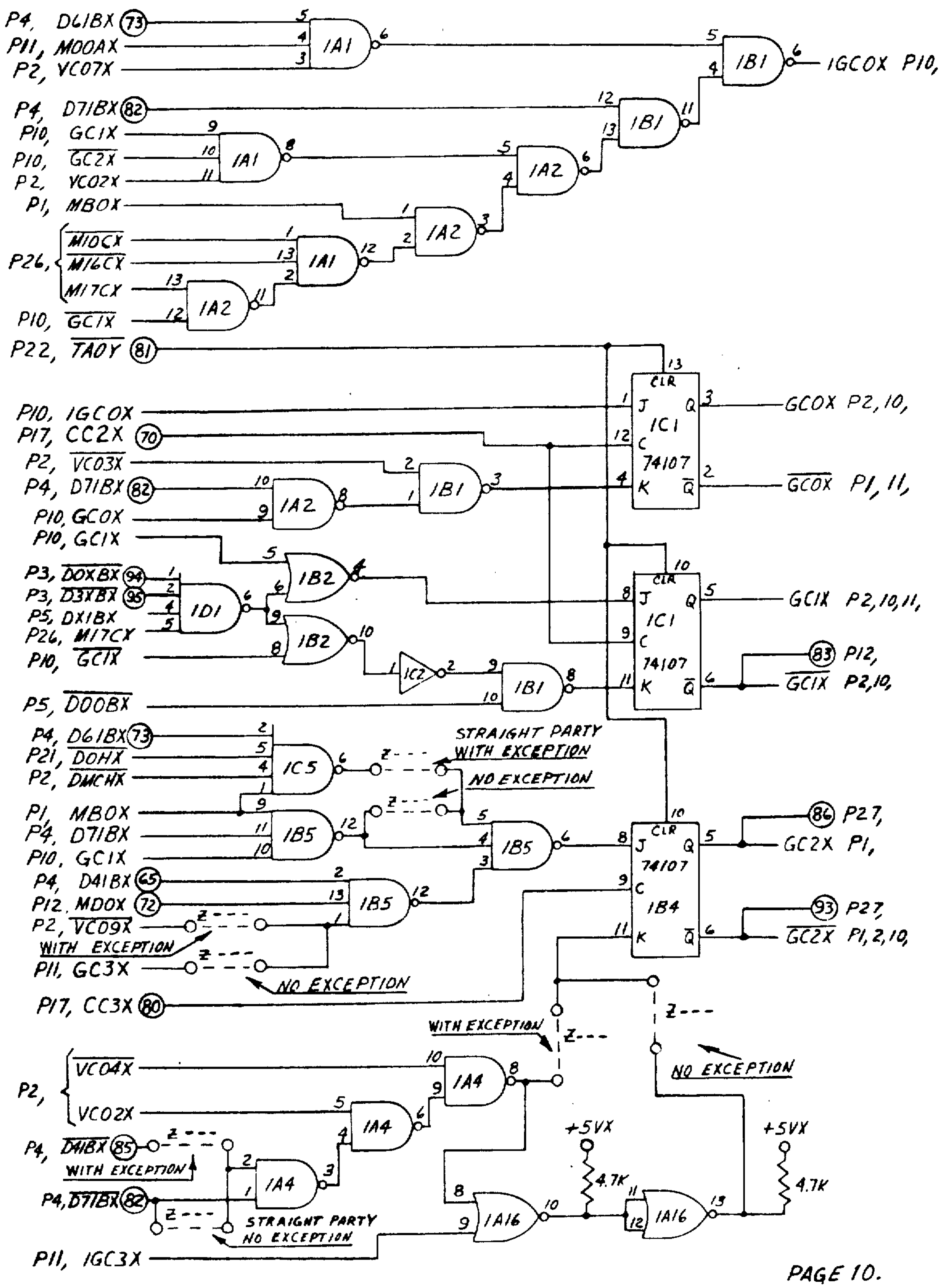
Figure 13:
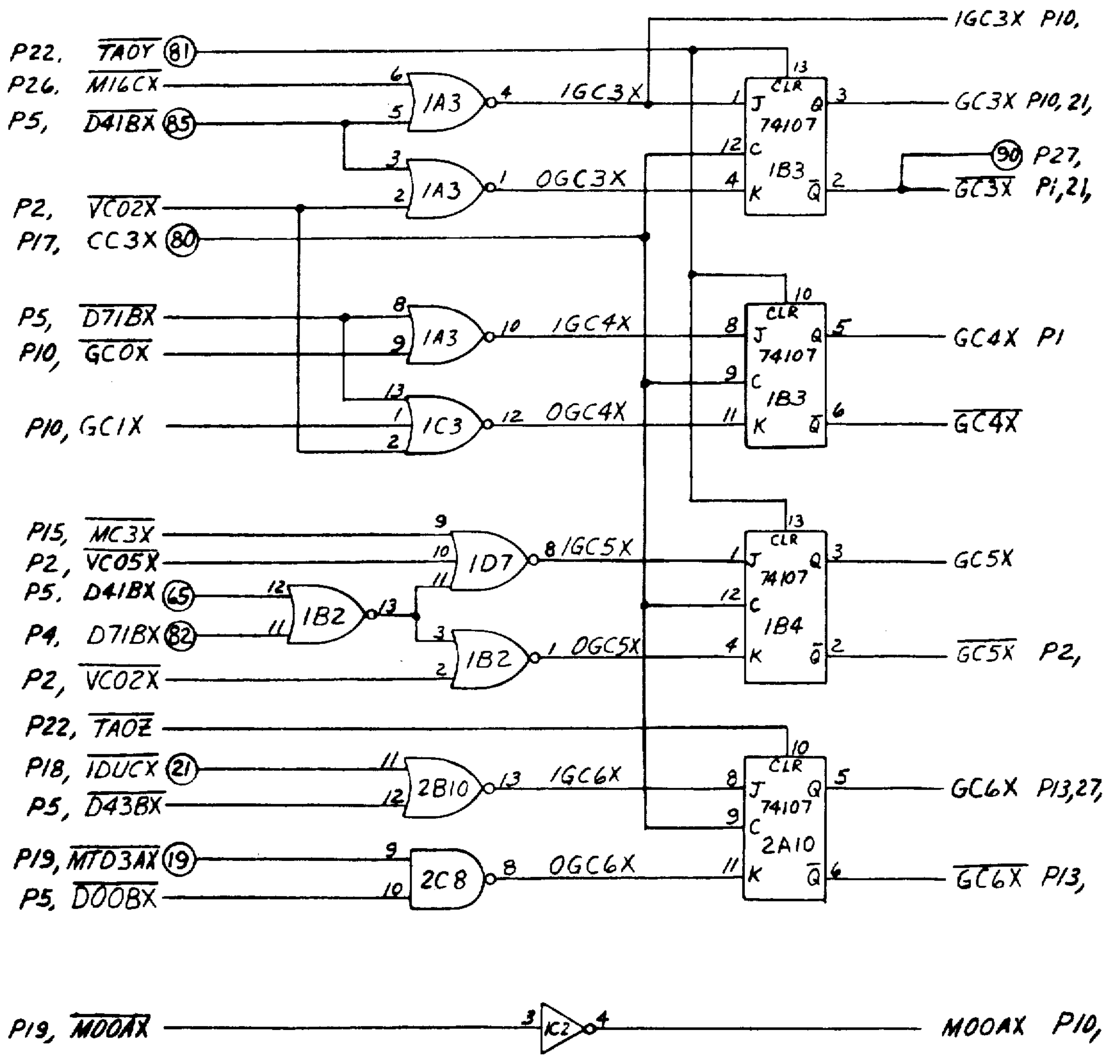

Clearing of the low order program counter terms will be observed by tracing TAOX to page 7, FIG. 9, at the bottom of the drawing where it enters gate 2D7 forming the term $\overline{\text{ODBLX}}$. This term is used at the top of page 3, FIG. 5, where it enters the clear input to the DBOX and DBIX flip-flops. Clear occurs in all cases when the voltage is low which $\overline{\text{ODBLX}}$ will be when TAOX is high. It will be noted that TAOX or one of its derivative terms resets all flipflops in the system which require a reset condition. On many of the flip-flops shown in the logical diagrams, the reset is referred to as clear. At this stage the system flipflops have been cleared as power was plugged in. The memory, however, may be in any random condition. The system is now ready for the precinct operator to insert a key into the key switch and turn it, which will apply power to the memory. When AC power was connected, a solenoid interlock on the key switch is made active so that the key switch may be turned through its two operating stages. As mentioned, power is applied to the memory and, as indicated on page 1 of the logical diagram, a pulse is generated by S2 on the front panel which is labeled $\overline{\text{EAIX-P}}$. The pulse occurs when the momentary switch is released and the O charge stored on the 15 microfarad capacitor gives the negative pulse required to activate the trigger of the TAIX one shot. TAIX is the print request one shot.

Figure 14:
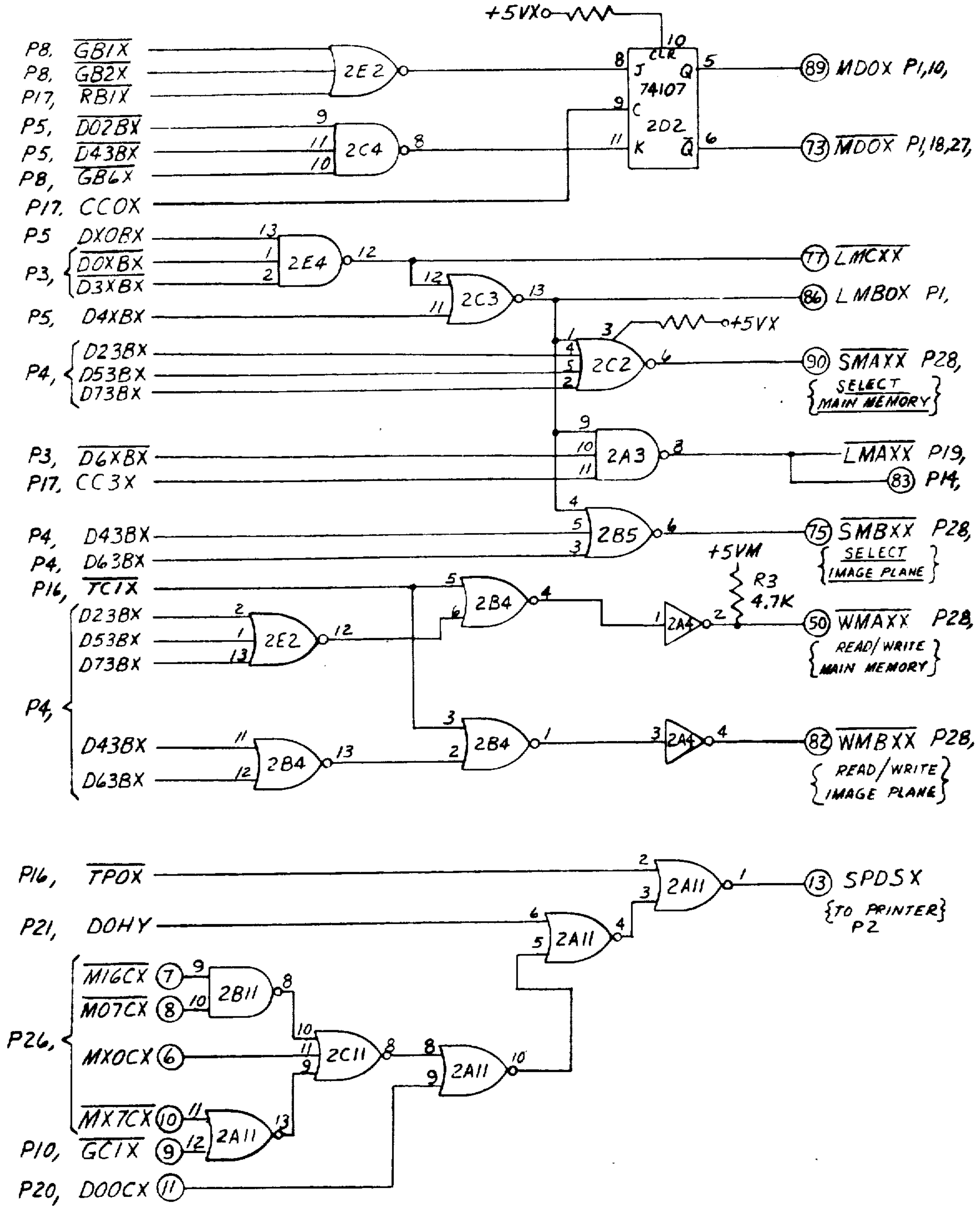
Figure 15:
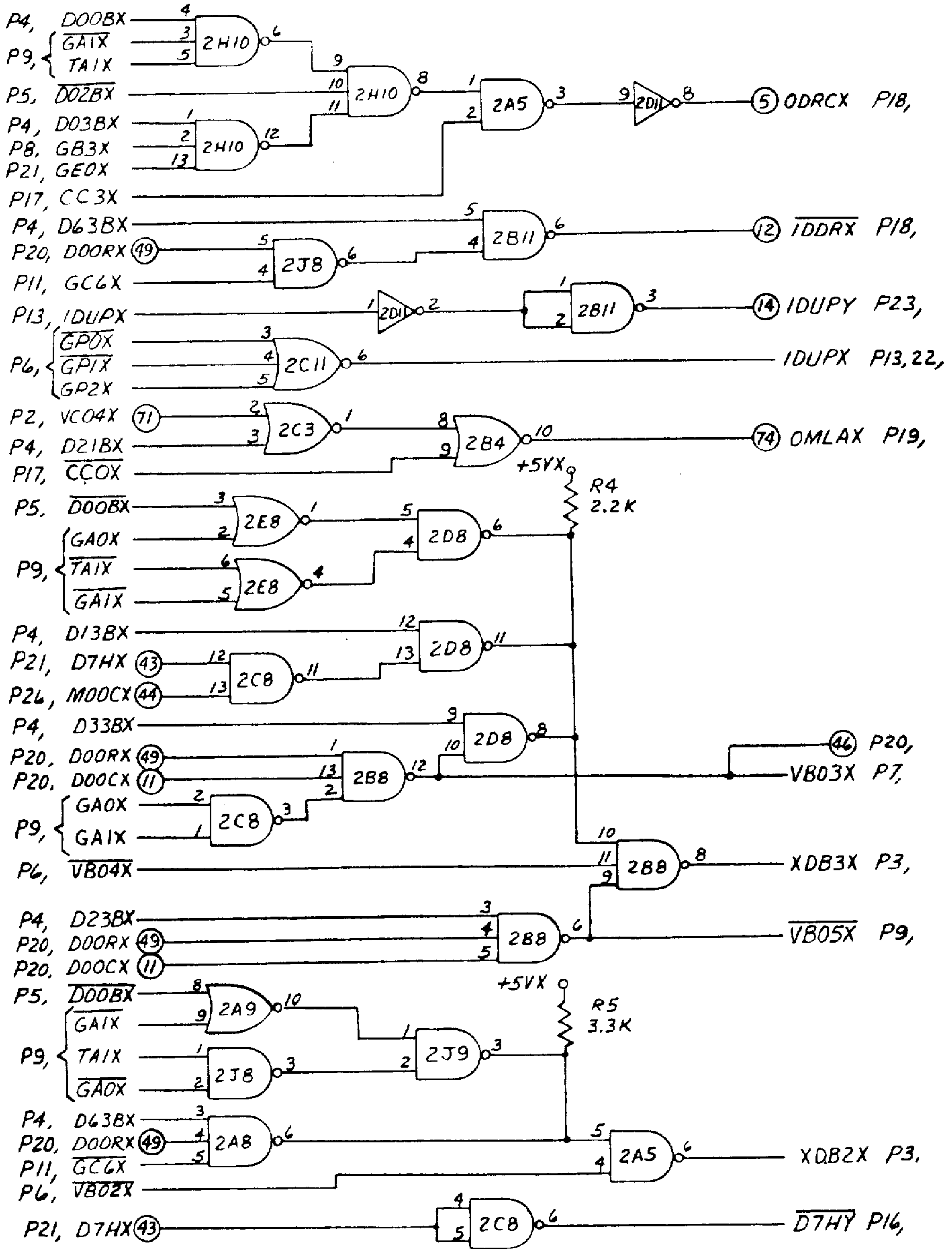
Figure 16:
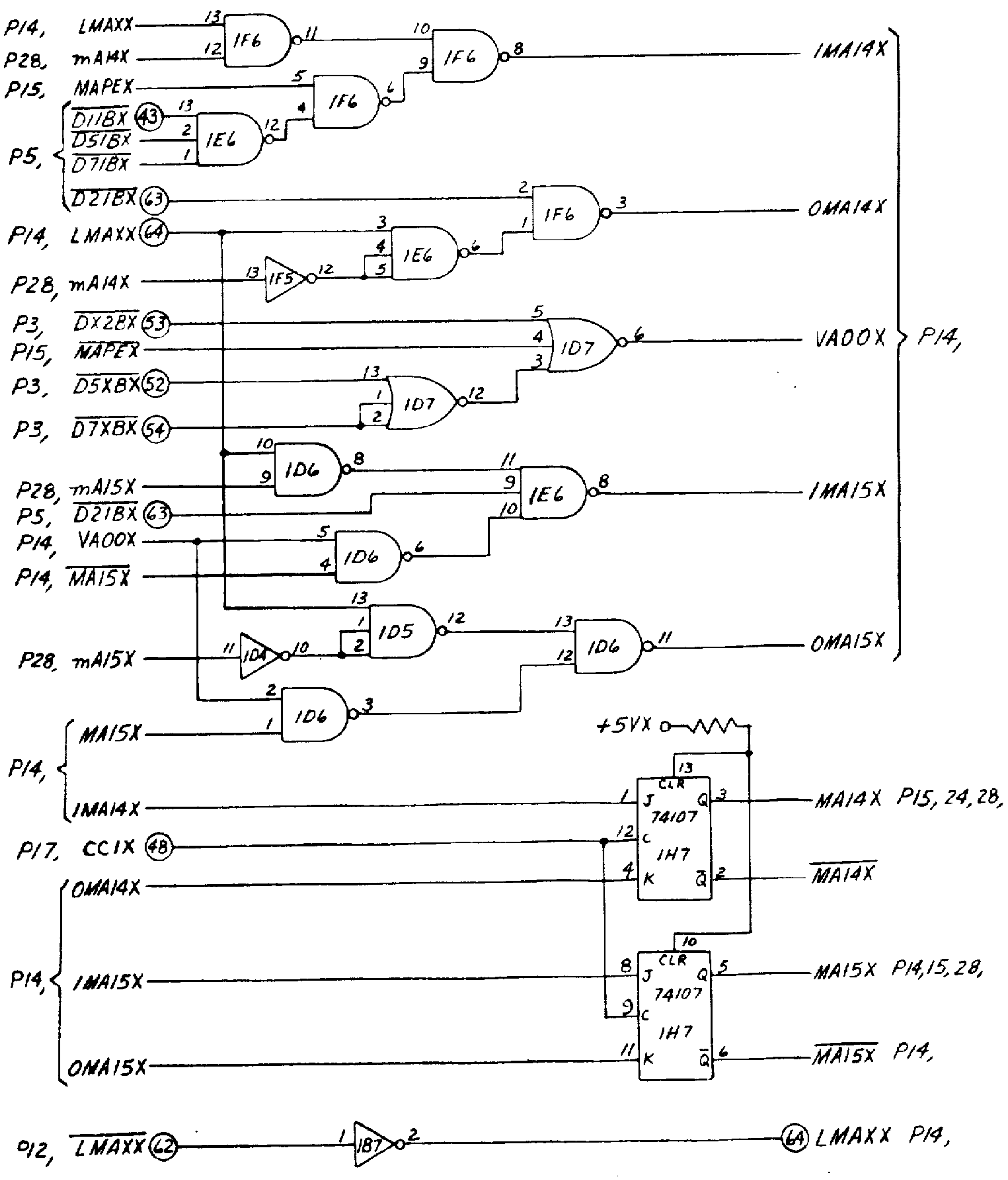
Figure 17:
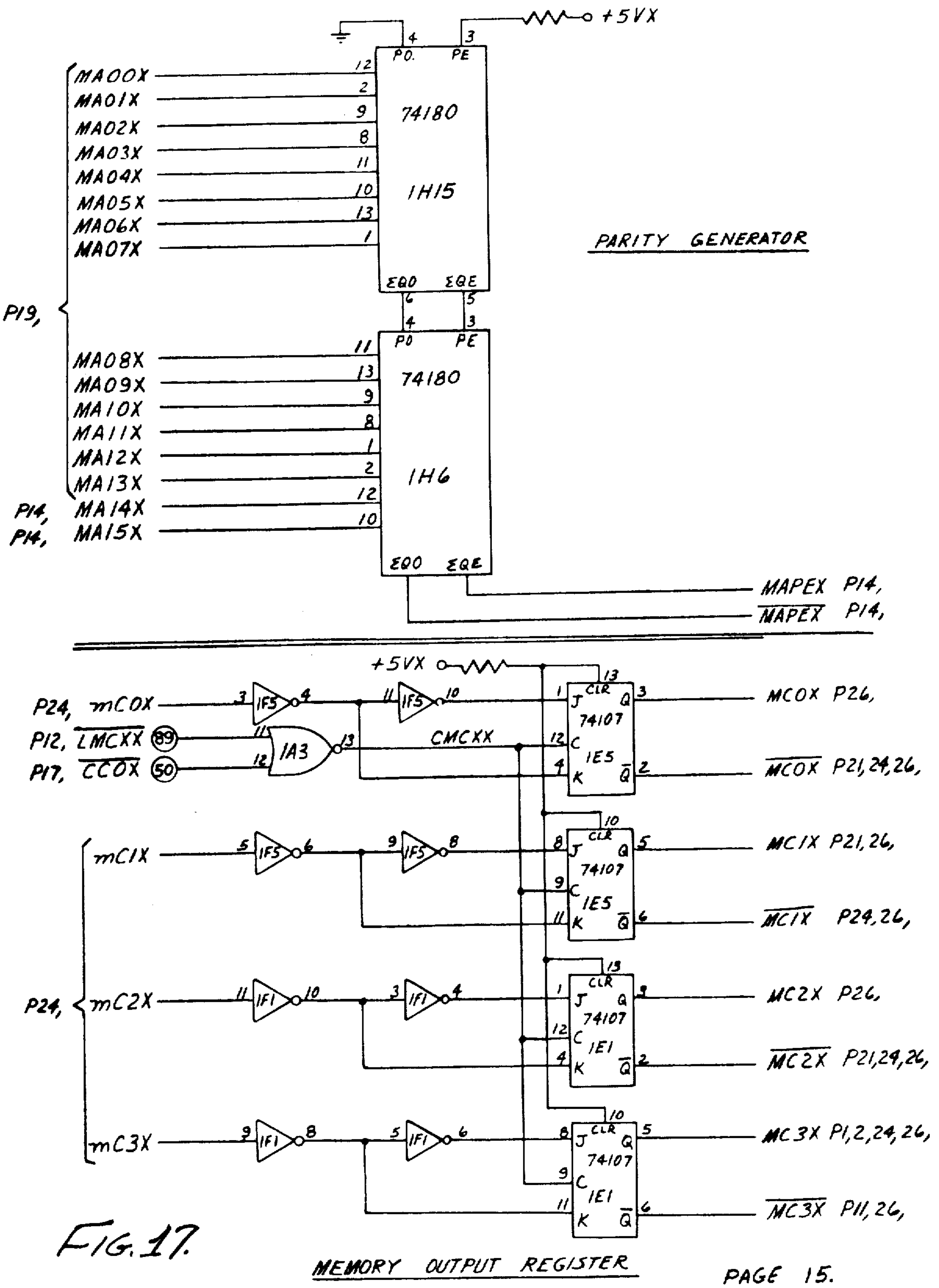
Figure 18:
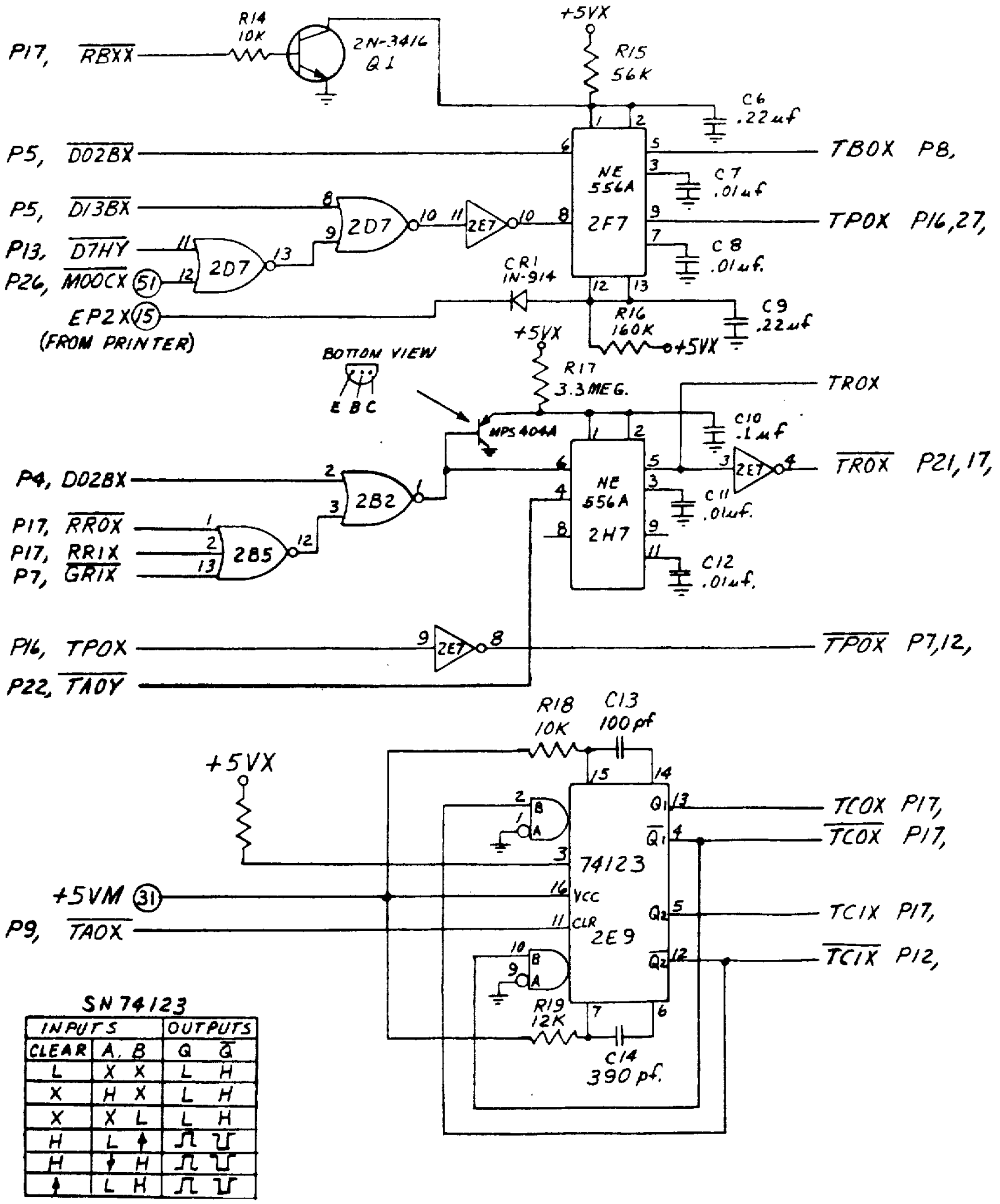
Figure 19:
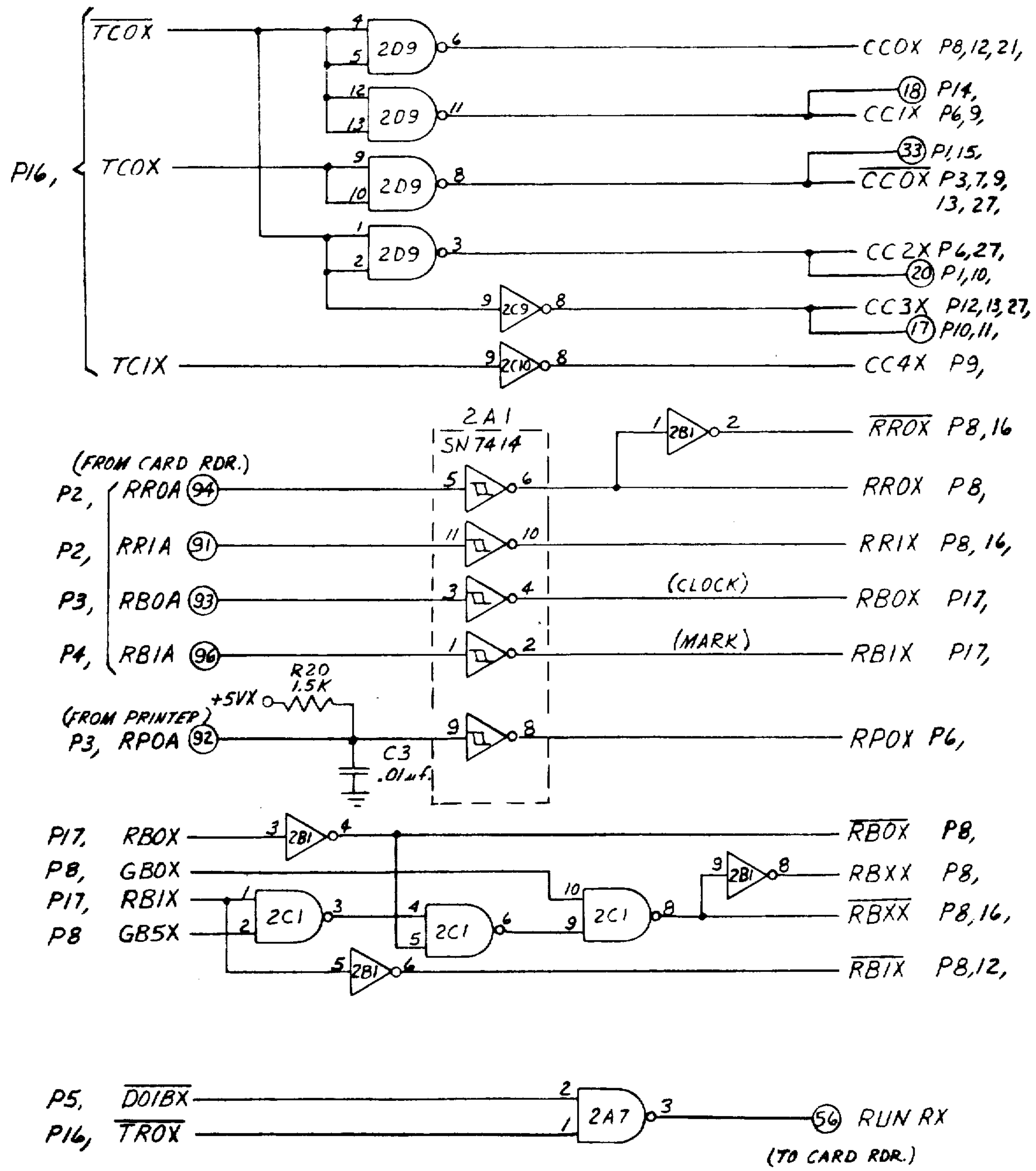
Figure 20:
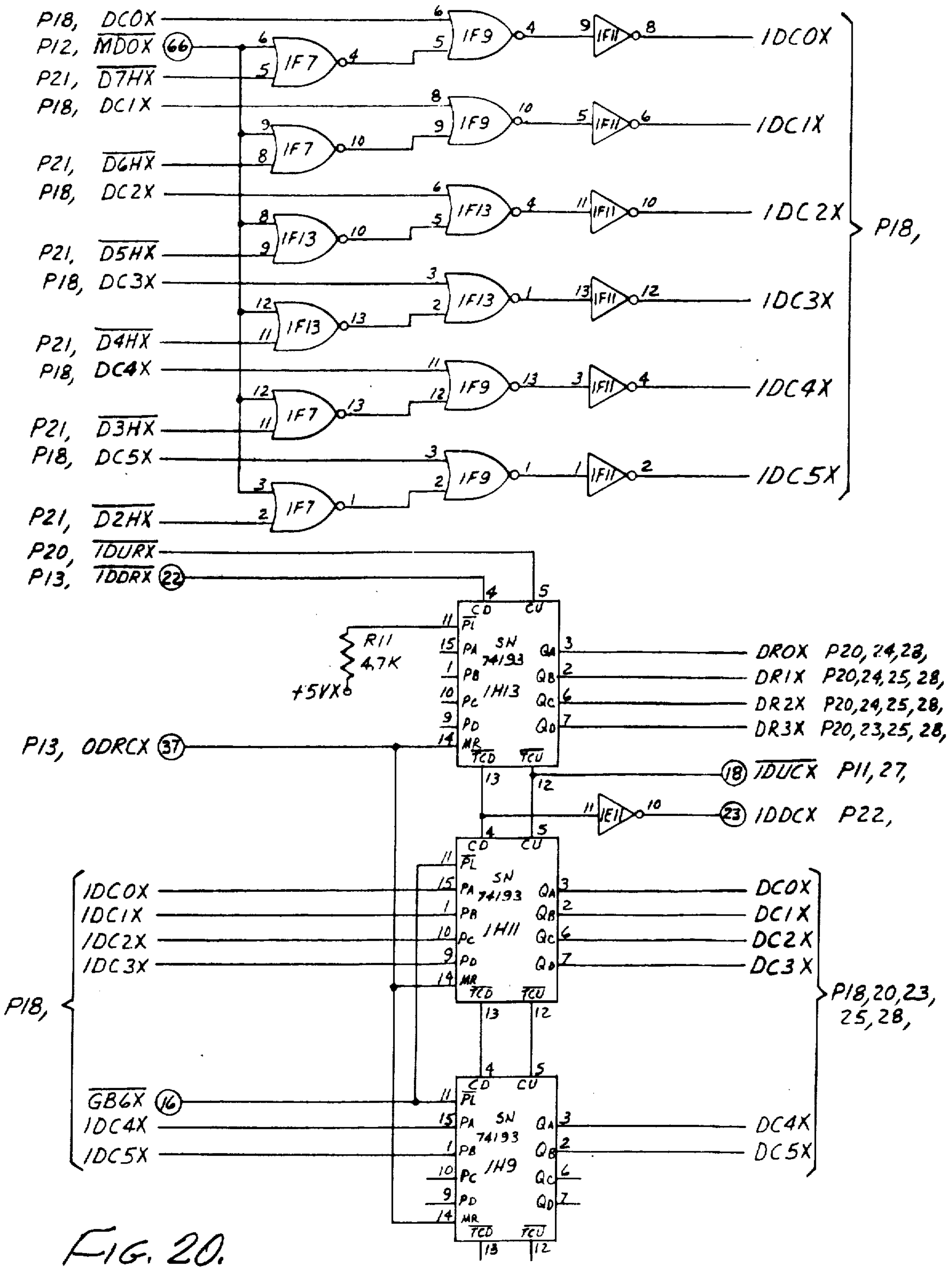
Figure 21:
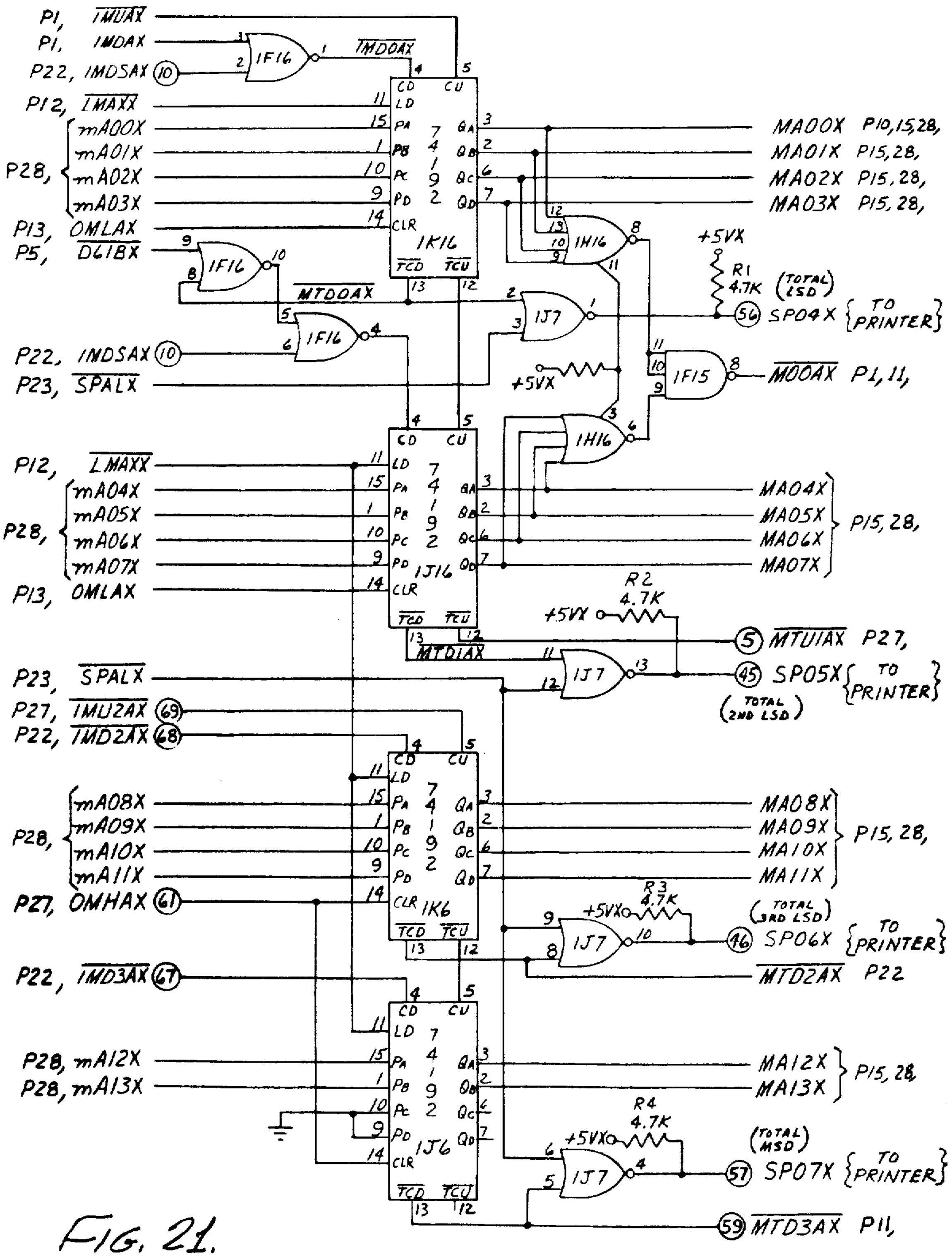
Figure 22:
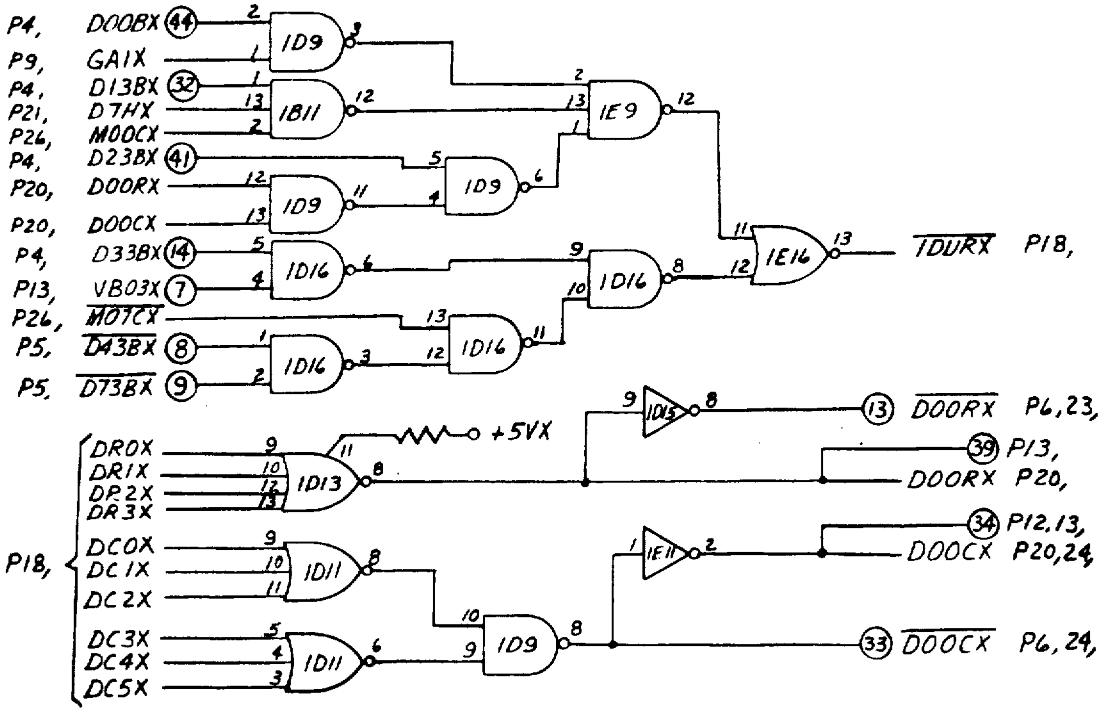
Figure 23:
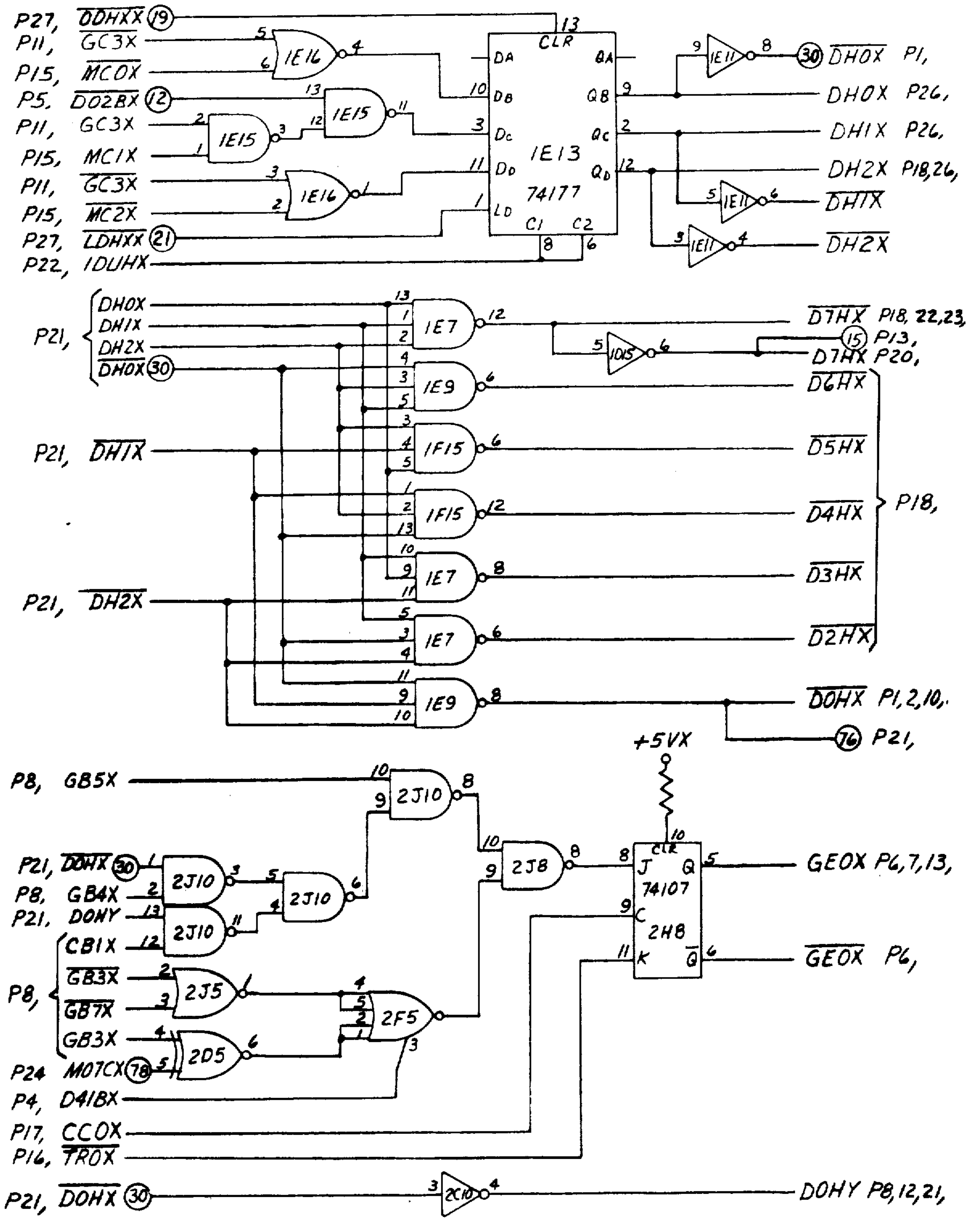
Figure 24:
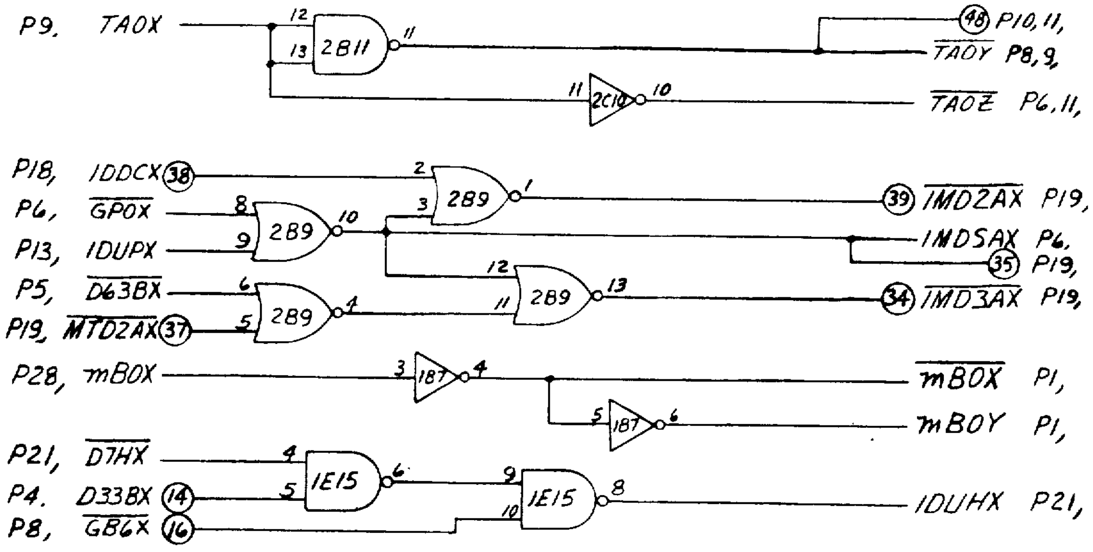
Figure 25:
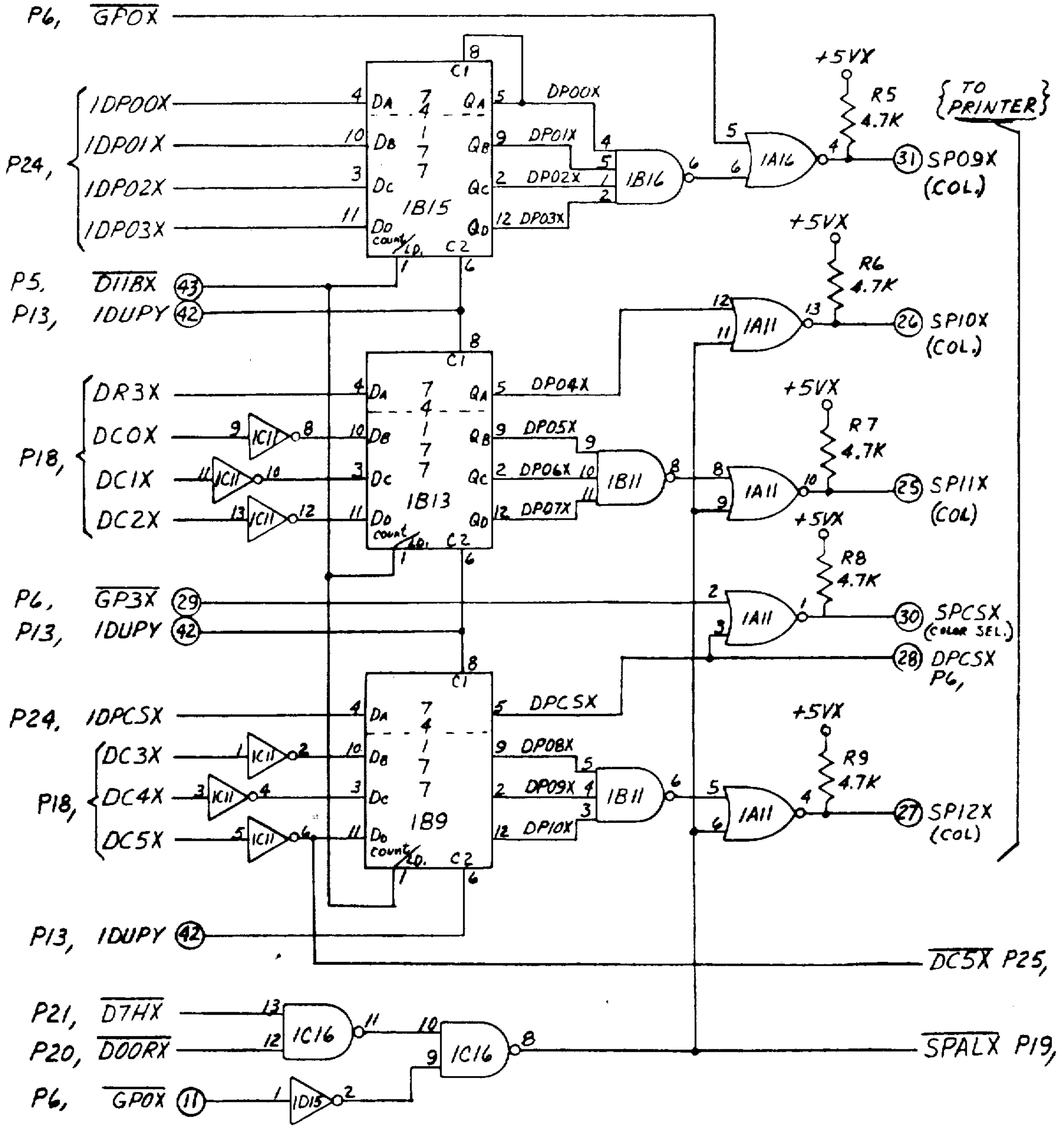
Figure 26:
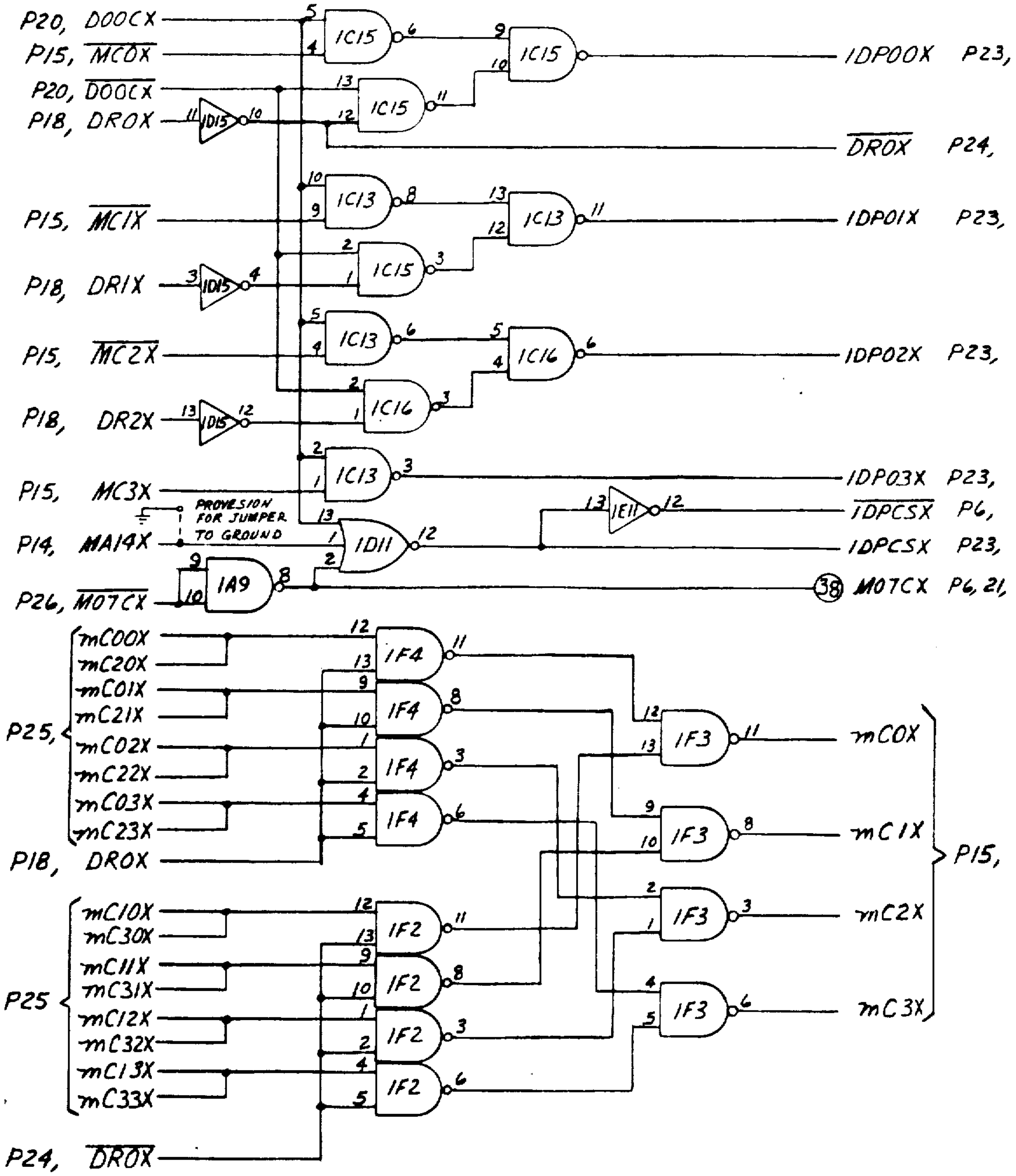
Figure 27:
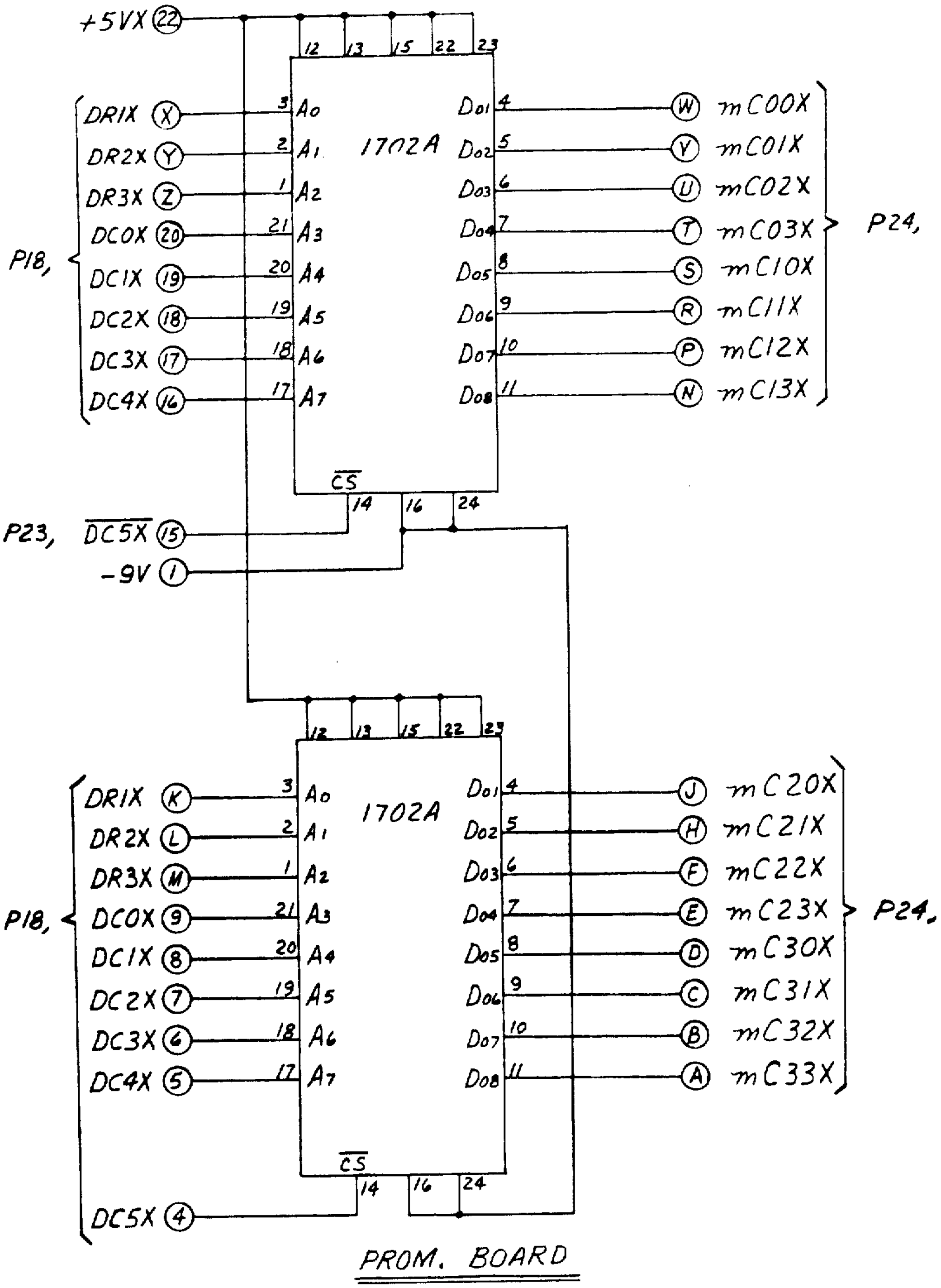
Figure 28:
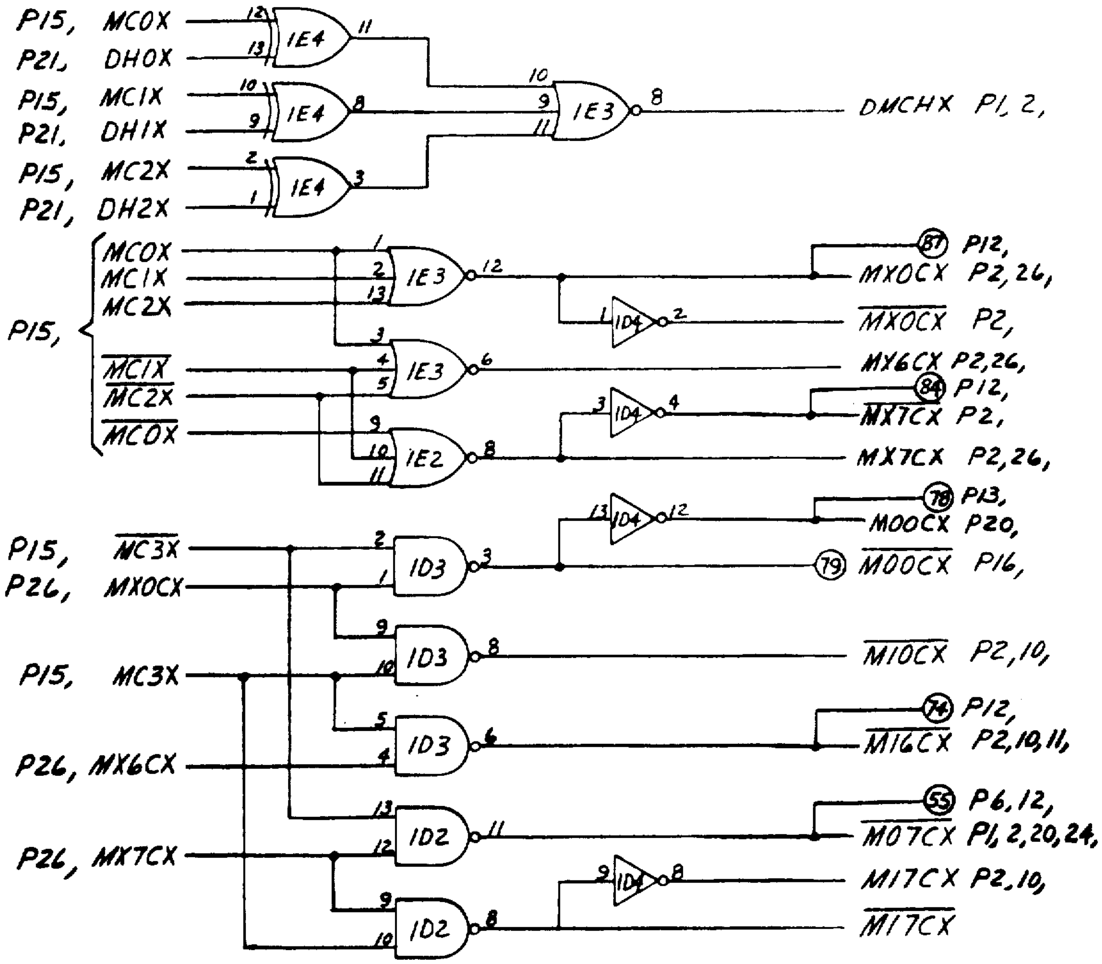
Figure 29:
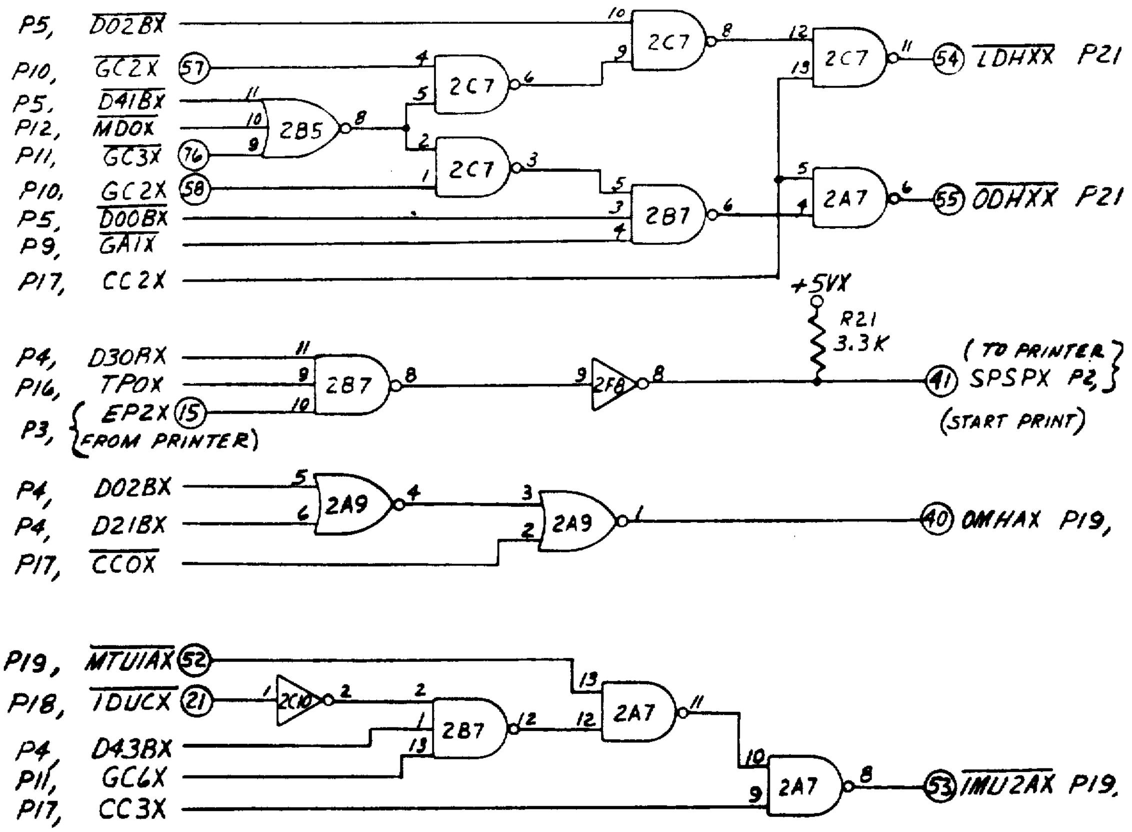

It will be observed that the logic diagrams of the drawings form an interconnected whole. Thus, in the middle of the right-hand margin of FIG. 5, page 3, the text: DOXBX P4, 7, 12 indicates that the further connections of this lead are shown on page 4 (FIG. 6), page 7 (FIG. 9), and page 12 (FIG. 14). In turn, the reappearance of this lead on the latter pages is shown on the left-hand side thereof, with an indication of the originating page, page 3 in this example.

As already mentioned, the drawings and introductory text alone are sufficient to enable those skilled in the art to understand and practice the invention. The rather detailed description hereinabove thus is presented primarily as a convenience to those less skilled in the art.

From all of the foregoing and the drawings, it will be clear that our inventive system may be characterized, essentially from the standpoint of the sequence of events, for which the flow diagram of FIG. 2 is a convenient guide, as follows:

A ballot reading and vote counting system comprising a ballot feeding and mark sensing means which operates to move a ballot past a pair of optoelectronic reading heads one of which senses positional indexing marks (clock marks), another of which senses vote marks, which may for example be registered by pencil or by marking stamp, and each of which senses ballot identification code marks (header), as when a properly oriented ballot is placed in the entry throat of the reader; numeric printer means operating to imprint a paper tape containing a series of two numbers, typically each four digits in length the first of which uniquely identifies the total which is printed as the second number, these numbers commencing after a series of seven one digit numerals, forming a precinct identification number; digital programmable read only memory means which is erasable and electrically reprogrammable and which contains an instruction word, each represented by a plurality of bits, for each possible address of main random access memory and which thereby contains an instruction for each possible vote marking position on all ballot formats capable of interpretation by the system, one sub-portion of memory addresses, which may be termed page O of memory, causing precinct identification digits to be printed from said programmable read only memory; a further digital memory means which may be termed ballot image memory, for storing an image of all marks sensed as a ballot passes the mark sensing station and retaining the ballot mark image until those marks determined to be valid have caused the corresponding main memory totals to be incremented; a still further digital memory means which may be termed main memory, capable of incremental updating of totals as indicated by corrected ballot image memory marks, each main memory address containing a plurality of bits sufficient to encode a number representing the systems maximum vote counting capacity for each candidate of each response to a question or measure; a functional interlocking circuit means which prevents the accepting and feeding of any ballot until such time as a key operated switch has been actuated which causes every address of main memory to be selected in sequence and cleared to zero whereupon a printout is initiated which lists the precinct identification number followed by the series of printout total identification numbers and the corresponding zero totals read out of memory, and which prevents the accepting and feeding of any ballot after such time as the key operated switch has been actuated a second time causing totals to be printed out, such printout constituting the closing off pol's and such interlock preventing the undetected unauthorized reading of totals prior to the close of polls; a control means which causes the header portion of each ballot to preset the high order several bits of memory address (termed page number) and the low order several bits to start counting from zero for each index mark (clock mark) sensed (the low order group of bits termed line number) with overflow from a full line count causing the page number to increment and requiring no logical limitation to the number of lines contained on any single ballot and which causes each mark sensed on a ballot to be registered as a bit stored at the page and line address of ballot image memory corresponding to the address count at which that mark is sensed; a further control means which causes the number of marks sensed within the boundaries of each office, question or issue to be compared with the maximum allowable number of votes permitted for one voter for that office, question or issue and a status bit recorded in the ballot image memory wherever the permitted number of votes has been exceeded so that no marks from overvoted offices, questions or issues will be incremented into main memory totals but instead the fact of overvote will be incremented in the overvote storage memory address for that particular office, question or issue, and which will therefore cause all marks recorded in ballot image memory without presence of the overvote status bit to be incremented at the corresponding main memory address; a second further control means which will verify that the defined number of header (page number) bits have been sensed prior to the sensing of coincident printed marks by each read head and that exactly the proper number of index (clock) marks have been sensed as programmed in the programmable read only memory at the end of ballot and that at least one mark has been sensed by the mark reading head and will inhibit the updating of all memory totals except page zero line zero in the event that any of the foregoing verifications cannot be made and will activate an ink marker placing an identifying mark on the back of any ballot whose marks have not been included in the tally, page zero line zero storing the number of ballots fed but not read; a third further control means which will provide for a single vote mark on a ballot indicating the party choice of a voter causing every candidate of the chosen party on that ballot to receive a count with further provision that if a vote is placed for a candidate of a party other than of the party choice, in that office only, the exception vote will be counted rather than the party vote; a fourth further control means which will tabulate recall votes and candidates in accordance with recall laws which require a vote of YES or NO but not both on the recall question in order to enable counting of votes for replacement candidates marked on that ballot.

Figure 1:
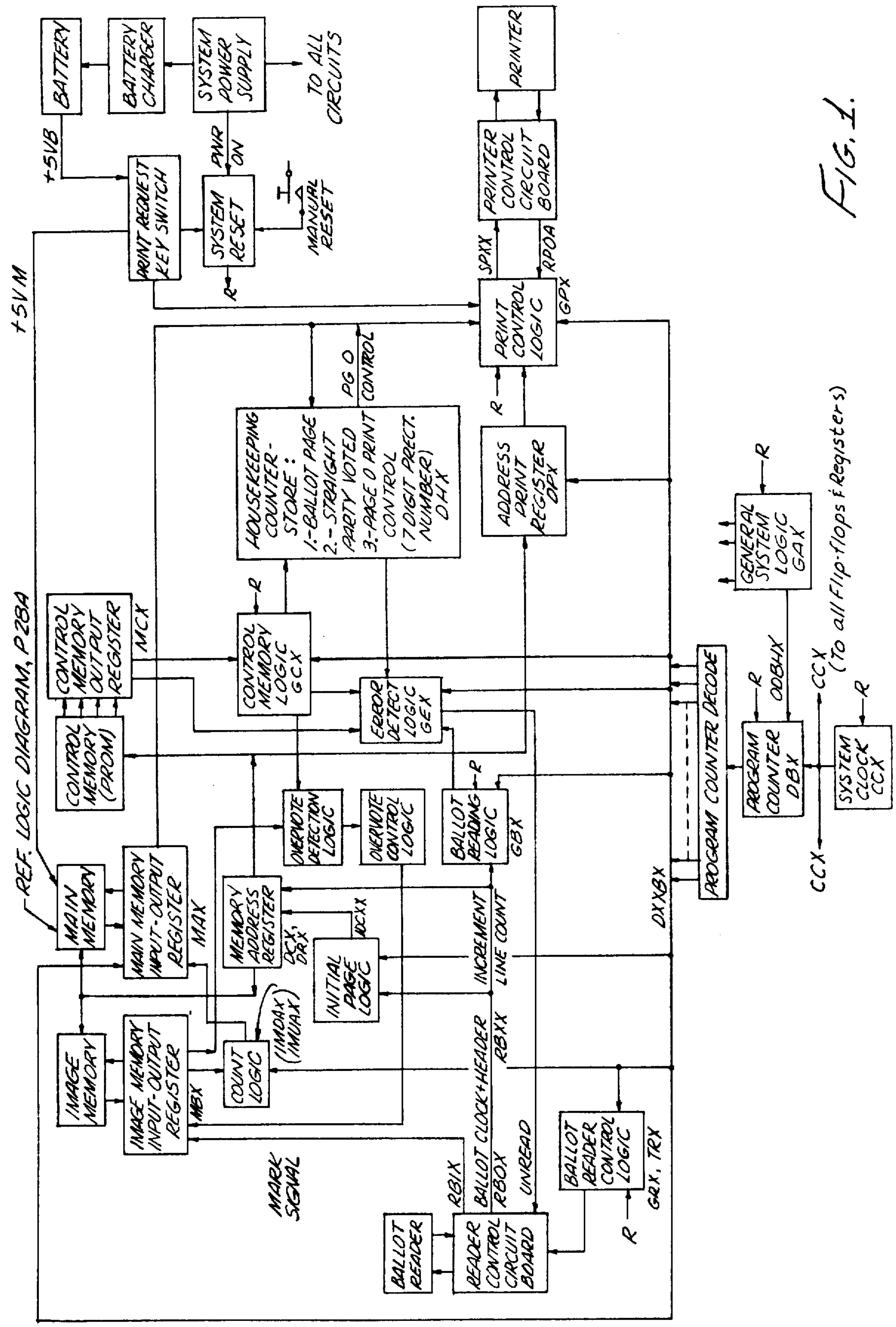
FIG. 1 is a block diagram of the tallying mechanism.

Again, our inventive system may be characterized, essentially from the standpoint of structure, for which the block diagram of FIG. 1 is a convenient guide, as follows:

A vote tallying system comprising: a programmable read only (control) memory for storing a number of instruction words, a group of which instruction words coincide with possible voting positions on a plurality of ballot cards, each instruction word represented by a plurality of bits, said plurality of bits including a low order group thereof for providing discrete classification of each possible voting position relative to party affiliation if any, question/issue, write-in or inactive voting position relationship and a high order bit for providing office area demarcation data, ballot card demarcation data and number of votes to be allowed per office on any one ballot card, another group of which instruction words provide for storing binary coded decimal numerals in any desired sequence, said programmable read only memory having a plurality of input address lines for selecting each instruction word and an output line for each bit of said instruction word; a digital (image)

memory providing one bit of storage for each possible voting position on a plurality of ballot cards for the temporary storage of binary image of the votes read from any ballot card and for storage of a single bit generated relative to each office, such generated bit to provide a temporary control flag for any office wherein the number of votes recorded for such office from the reading of any single ballot card, exceeds the number of votes allowed for such office, said digital memory having a plurality of input address lines for selecting each location of storage, a control line for writing into or reading out of a selected location of storage, an input line for setting the storage bit of a selected storage location to its binary "one" or binary "zero" state during a memory "write" operation and an output line for sensing the binary one or binary zero state of the bit at the selected storage location during a memory "read" operation; a digital (totals) memory providing a plurality of bits of storage for each possible voting position on a plurality of ballot cards for the long term storage of binary coded decimal numerals representing accumulated totals of votes tallied for each voting position, overvotes detected for each office, ballot cards tallied of each ballot card type and total of invalid or mis-read ballot cards not tallied, said digital memory having a plurality of input address lines for selecting any location of storage, a control line for writing into or reading out of a selected location of storage, one each input line for setting each bit of a selected storage location to its binary "one" or binary "zero" state during a memory write operation and a plurality of output lines for sensing the binary one or binary zero state of each bit of a selected storage location during a memory read operation; control means for addressing said input address lines of all three memories simultaneously for causing, one at a time, the coincident location of each memory to be available for a "read memory" operation or for each memory other than the programmable read-only memory to be available for a "write memory" operation; control means for independently selecting either the image memory or the totals memory or both to be active during any read memory or write memory operation.

While we have explained and illustrated our invention with the aid of numerous examples, it will be understood that many details may be varied within the spirit and scope of the invention.

Having described the invention, we claim:

1. A ballot reading and vote counting system comprising:

ballot feeding and mark sensing means which operates to move a ballot past a pair of optoelectronic reading heads one of which senses positional indexing marks another of which senses vote marks and each of which senses ballot identification code marks;

numeric printer means operating to imprint a paper tape containing a series of two number, typically each four digits in length the first of which uniquely identifies the total which is printed as the second number, these numbers commencing after a series of seven one-digit numerals, forming a precinct identification number;

digital programmable read only memory means which is erasable and electrically reprogrammable and which contains an instruction word, each represented by a plurality of bits, for each possible address of said digital programmable read only memory means and which thereby contains an instruction for each possible vote marking position on all ballot formats capable of interpretation by the system, one sub-portion of memory addresses, which may be termed page 0 of memory, causing precinct identification digits to be printed from said programmable read only memory means;

a further digital memory means which may be termed ballot image memory, for storing an image of all marks sensed as a ballot passes the mark sensing means and retaining the ballot mark image until those marks determined to be valid have caused the corresponding below-described main memory totals to be incremented;

a still further digital memory means which may be termed main memory, capable of incremental updating of totals as indicated by corrected ballot image memory marks, each main memory address containing a plurality of bits sufficient to encode a number representing the system's maximum vote counting capacity for each candidate or each response to a question or measure;

a functional interlocking circuit means which prevents the accepting and feeding of any ballot until such time as a key operated switch has been actuated which causes every address of main memory to be selected in sequence and cleared to zero whereupon a printout is initiated which lists the precinct identification number followed by the series of printout total identification numbers and the corresponding zero totals read out of memory, and which prevents the accepting and feeding of any ballot after such time as the key operated switch has been actuated a second time causing totals to be printed out, such printout constituting the closing of polls and such interlock preventing the undetected unauthorized reading of totals prior to the close of polls;

control means which causes the header portion of each ballot to preset the high order several bits of memory address (termed page number) and the low order several bits to start counting from zero for each index mark (clock mark) sensed (the low order group of bits termed line number) with overflow from a full line count causing the page number to increment and requiring no logical limitation to the number of lines contained on any single ballot and which causes each mark sensed on a ballot to be registered as a bit stored at the page and line address of said digital programmable read only memory means corresponding to the address count at which that mark is sensed;

further control means which causes the number of marks sensed within the boundaries of each office, question or issue to be compared with the maximum allowable number of votes permitted for one voter for that office, question or issue and a status bit recorded in the said digital programmable read only memory means wherever the permitted number of votes has been exceeded so that no marks from overvoted offices, questions or issues will be incremented into main memory totals but instead the fact of overvote will be incremented in the overvote storage memory address for that particular office, question or issue, and which will therefore cause all marks recorded in said digital programmable read only memory means without presence of the overvote status bit to be incremented at the corresponding main memory address;

second further control means which will verify that the defined number of header (page number) bits have been sensed prior to the sensing of coincident printed marks by each read head and that exactly the proper number of index (clock) marks have been sensed as programmed in the programmable read only memory means at the end of ballot and that at least one mark has been sensed by the mark reading head and will inhibit the updating of all memory totals except page zero line zero in the event that any of the foregoing verifications cannot be made and will activate an ink marker placing an identifying mark on the back of any ballot whose marks have not been included in the tally, page zero line zero storing the number of ballots fed but not read;

third further control means which will provide for a single vote mark on a ballot indicating the party choice of a voter causing every candidate of the chosen party on that ballot to receive a count with further provision that if a vote is placed for a candidate of a party other than of the party choice, in that office only, the exception vote will be counted rather than the party vote; and fourth further control means which will tabulate recall votes and candidates in accordance with recall laws which require a vote of YES or NO but not both on the recal question in order to enable counting of votes for replacement candidates marked on that ballot.

2. A vote tallying system comprising:

a programmable read only (control) memory for storing a number of instruction words, a group of which instruction words coincides with possible voting positions on a plurality of ballot cards, each instruction word represented by a plurality of bits, said plurality of bits including a low order group thereof for providing discrete classification of each possible voting position relative to party affiliation if any, question/issue, write-in or inactive voting position relationship and a high order bit for providing office area demarcation data, ballot card demarcation data and number of votes to be allowed per office on any one ballot card, another group of which instruction words provide for storing binary coded decimal numerals in any desired sequence, said programmable read only memory having a plurality of input address lines for selecting each instruction word and an output line for each bit of said instruction word;

a digital (image) memory providing one bit of storage for each possible voting position on a plurality of ballot cards for the temporary storage of binary image of the votes read from any ballot card and for storage of a single bit generated relative to each office, such generated but to provide a temporary control flag for any office wherein the number of votes recorded for such office from the reading of any single ballot card, exceeds the number of votes allowed for such office, said digital (image) memory having a plurality of input address lines for selecting each location of storage, a control line for writing into or reading out of a selected location of storage, an input line for setting the storage bit of a selected storage location to its binary "one" or binary "zero" state during a memory "write" operation and an output line for sensing the binary one or binary zero state of the bit at the selected storage location during a memory "read" operation;

. a digital (totals) memory providing a plurality of bits of storage for each possible voting position on a plurality of ballot cards for the long term storage of binary coded decimal numerals representing accumulated totals of votes tallied for each voting position, overvotes detected for each office, ballot cards tallied of each ballot card type and total of invalid or mis-read ballot cards not tallied, said digital (totals) memory having a plurality of input address lines for selecting any location of storage, a control line for writing into or reading out of a selected location of storage, one each input line for setting each bit of a selected storage location to its binary "one" or binary "zero" state during a memory write operation and a plurality of output lines for sensing the binary one or binary zero state of each bit of a selected storage location during a memory read operation;

control means for addressing said input address lines of all three memories simultaneously for causing, one at a time, the coincident location of each memory to be available for a "read memory" operation or for each memory other than the programmable read-only memory to be available for a "write memory" operation and;

control means for independently selecting either the image memory or the totals memory or both to be active during any read memory or write memory operation.

* * * * *